United States Patent
Uher et al.

(10) Patent No.: US 11,069,484 B2
(45) Date of Patent: Jul. 20, 2021

(54) MODULE CONTAINING HERMETICALLY SEALED CAPACITORS

(71) Applicant: AVX Corporation, Fountain Inn, SC (US)

(72) Inventors: Miloslav Uher, Lanskroun (CZ); Jiri Navratil, Veseli nad Moravou (CZ)

(73) Assignee: AVX Corporation, Fountain Inn, SC (US)

( * ) Notice: Subject to any disclaimer, the term of this patent is extended or adjusted under 35 U.S.C. 154(b) by 175 days.

(21) Appl. No.: 16/018,139

(22) Filed: Jun. 26, 2018

(65) Prior Publication Data
US 2019/0006115 A1 Jan. 3, 2019

Related U.S. Application Data

(60) Provisional application No. 62/526,469, filed on Jun. 29, 2017, provisional application No. 62/573,300, filed on Oct. 17, 2017.

(51) Int. Cl.
| | |
|---|---|
| *H01G 9/012* | (2006.01) |
| *H01G 9/10* | (2006.01) |
| *H01G 9/15* | (2006.01) |
| *H01G 9/26* | (2006.01) |
| *H01G 9/14* | (2006.01) |
| *H01G 9/08* | (2006.01) |

(52) U.S. Cl.
CPC ............. *H01G 9/012* (2013.01); *H01G 9/08* (2013.01); *H01G 9/10* (2013.01); *H01G 9/14* (2013.01); *H01G 9/15* (2013.01); *H01G 9/26* (2013.01)

(58) Field of Classification Search
CPC .......... H01G 9/008; H01G 9/025; H01G 9/15
USPC ........................................................ 361/541
See application file for complete search history.

(56) References Cited

U.S. PATENT DOCUMENTS

| | | |
|---|---|---|
| 5,457,862 A | 10/1995 | Sakata et al. |
| 5,473,503 A | 12/1995 | Sakata et al. |
| 5,729,428 A | 3/1998 | Sakata et al. |
| 5,812,367 A | 9/1998 | Kudoh et al. |
| 6,081,418 A * | 6/2000 | Kuranuki ................ H01G 9/15 361/523 |
| 6,197,252 B1 | 3/2001 | Bishop et al. |

(Continued)

FOREIGN PATENT DOCUMENTS

KR 20110035327 4/2011

OTHER PUBLICATIONS

International Search Report and Written Opinion for PCT/US2018/038250 dated Oct. 8, 2018, 11 pages.

*Primary Examiner* — Eric W Thomas
(74) *Attorney, Agent, or Firm* — Dority & Manning, P.A.

(57) ABSTRACT

A module of capacitor assemblies is provided. To increase the capacitance and efficiency of the module, capacitor assemblies may be stacked. A variety of aspects of the module are controlled in the present invention, including the number of capacitor assemblies, the manner in which the capacitor assemblies are arranged and incorporated into the module, and the manner in which the capacitor assemblies are formed. For example, the anode terminations of each capacitor assembly are electrically connected and the cathode terminations of each capacitor assembly are electrically connected. The capacitance and efficiency of the module can be improved while maintaining the footprint of a single capacitor assembly.

18 Claims, 6 Drawing Sheets

(56) References Cited

U.S. PATENT DOCUMENTS

| | | |
|---|---|---|
| 6,674,635 B1 | 1/2004 | Fife et al. |
| 7,262,511 B2 | 8/2007 | Osako et al. |
| 7,656,647 B2 | 2/2010 | Edson et al. |
| 8,094,434 B2 | 1/2012 | Rawal et al. |
| 8,194,395 B2 | 6/2012 | Zednicek et al. |
| 8,279,584 B2 | 10/2012 | Zednickova |
| 8,289,679 B2 | 10/2012 | Cheng et al. |
| 8,300,387 B1 | 10/2012 | Zednickova et al. |
| 8,379,372 B2 | 2/2013 | Zednicek et al. |
| 8,576,544 B2 | 11/2013 | Rawal et al. |
| 8,780,530 B2 | 7/2014 | Zednicek et al. |
| 8,824,122 B2 | 9/2014 | Vilc et al. |
| 8,947,857 B2 | 2/2015 | Biler et al. |
| 9,214,285 B2 | 12/2015 | Biler |
| 9,224,541 B2 | 12/2015 | Vilc et al. |
| 9,490,077 B2 | 11/2016 | Kurita |
| 9,506,402 B2 | 11/2016 | Suciu et al. |
| 9,754,730 B2 | 9/2017 | Petrzilek et al. |
| 9,767,964 B2 | 9/2017 | Zednickova |
| 9,928,963 B2 | 3/2018 | Petrzilek et al. |
| 2012/0307420 A1* | 12/2012 | Zednicek ............ H01G 9/012 361/525 |
| 2014/0026501 A1 | 1/2014 | Schuetz et al. |
| 2016/0104580 A1 | 4/2016 | Maeshima et al. |
| 2016/0268049 A1 | 9/2016 | Petrzilek et al. |
| 2016/0268054 A1 | 9/2016 | Petrzilek et al. |
| 2017/0084398 A1 | 3/2017 | Biler et al. |
| 2018/0025848 A1 | 1/2018 | Zednickova |

\* cited by examiner

MODULE CONTAINING HERMETICALLY SEALED CAPACITORS

CROSS REFERENCE TO RELATED APPLICATIONS

The present application claims filing benefit of U.S. Provisional Patent Application Ser. Nos. 62/526,469 having a filing date of Jun. 29, 2017, and 62/573,300 having a filing date of Oct. 27, 2017, which are incorporated herein by reference in their entirety.

BACKGROUND OF THE INVENTION

Electrolytic capacitors (e.g., tantalum capacitors) are increasingly being used in the design of circuits due to their volumetric efficiency, reliability, and process compatibility. For example, one type of capacitor that has been developed is a solid electrolytic capacitor that includes an anode (e.g., tantalum), a dielectric oxide film (e.g., tantalum pentoxide, $Ta_2O_5$) formed on the anode, a solid electrolyte layer, and a cathode. The solid electrolyte layer may be formed from a conductive polymer, such as described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al. Unfortunately, however, the stability of such solid electrolytes is poor at high temperatures due to the tendency to transform from a doped to an un-doped state, or vice versa. In response to these and other problems, capacitors have been developed that are hermetically sealed to limit the contact of oxygen with the conductive polymer during use. U.S. Patent Publication No. 2009/0244812 to Rawal, et al., for instance, describes a capacitor assembly that includes a conductive polymer capacitor that is enclosed and hermetically sealed within a ceramic housing in the presence of an inert gas. According to Rawal, et al., the ceramic housing limits the amount of oxygen and moisture supplied to the conductive polymer so that it is less likely to oxidize in high temperature environments, thus increasing the thermal stability of the capacitor assembly. However, despite the benefits achieved with the hermetically sealed housing, there is still a need for increased capacitance and efficiency of the capacitor assemblies.

As such, a need currently exists for an improved solid electrolytic capacitor assembly.

SUMMARY OF THE INVENTION

In accordance with one embodiment of the present invention, a module of capacitor assemblies is disclosed that comprises first and second capacitor assemblies that each comprise a capacitor element comprising a sintered porous anode body, a dielectric layer that overlies the anode body, and a solid electrolyte overlying the dielectric layer; an anode lead that extends from the capacitor element; a housing that defines a surface and an interior cavity within which the capacitor element is positioned and hermetically sealed; and an external anode termination that is in electrical connection with the anode lead. The second capacitor assembly is disposed on the surface of the first capacitor assembly and the external anode termination of the first capacitor assembly is electrically connected to the external anode termination of the second capacitor assembly.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figure in which.

Figure 1:
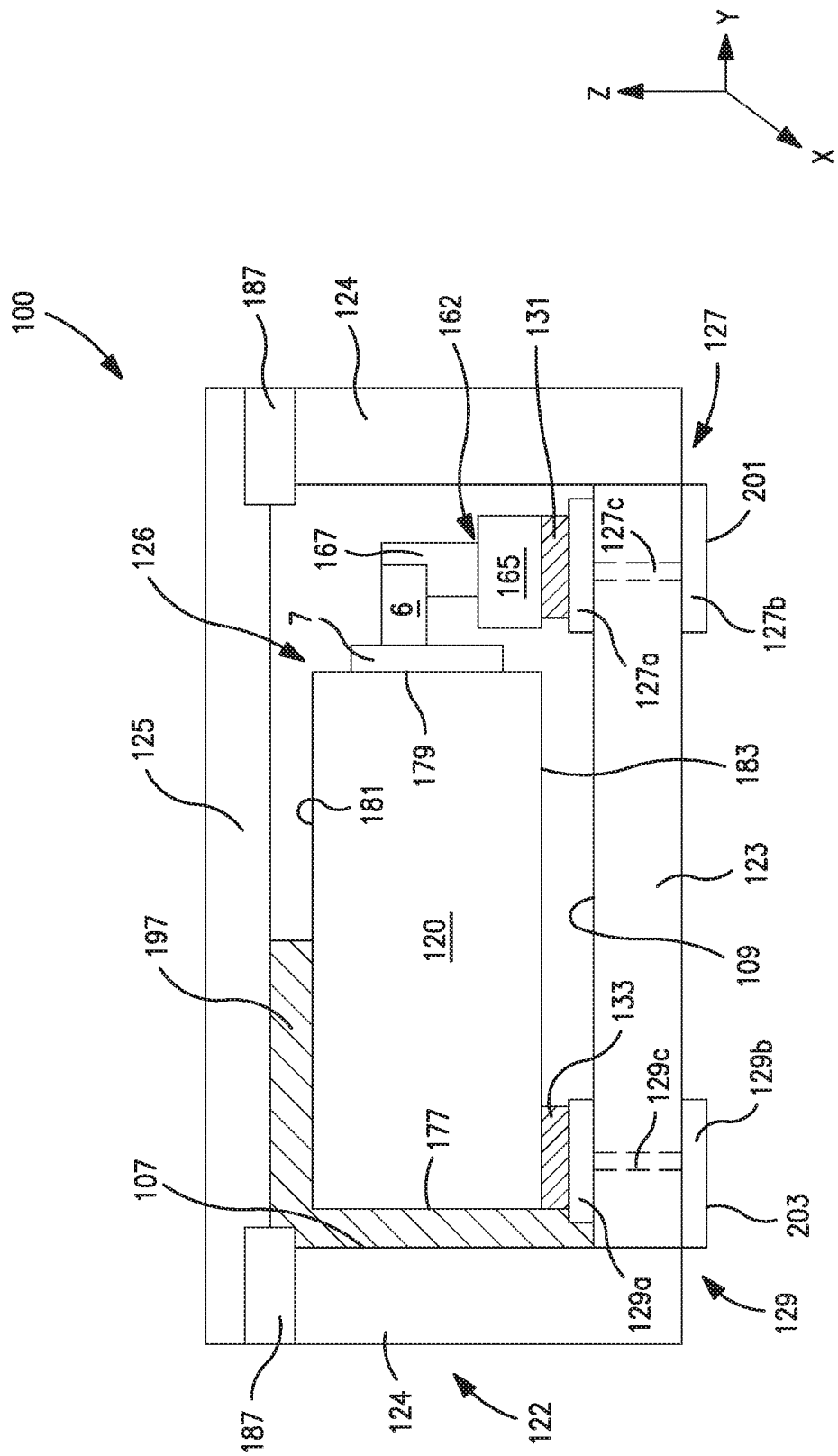
FIG. 1 is a cross-sectional view of one embodiment of a capacitor assembly of the module of the present invention.

Repeat use of references characters in the present specification and drawing is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a module includes two or more hermetically sealed capacitor assemblies. To improve the capacitance and volumetric efficiency of the module, hermetically sealed capacitor assemblies may be stacked (e.g., vertically stacked). A variety of aspects of the module are controlled in the present invention, including the manner in which the capacitor assemblies are arranged and the manner in which the capacitor assemblies are incorporated into the module. For instance, the anode external termination of each capacitor assembly is electrically connected and the external cathode termination of each capacitor assembly is electrically connected. The terminations may be connected, for example, by a metal plate resistance welded to the terminations. The resulting module has an increased capacitance while maintaining the same footprint of a single capacitor assembly. The configuration may allow the space above the capacitor assembly on a circuit board to be used thereby maximizing the capacitance and efficiency of the device.

Each capacitor assembly includes at least one capacitor element including a sintered porous anode body, a dielectric layer that overlies the anode body, and a solid electrolyte overlying the dielectric layer. An anode lead extends from the capacitor element. The capacitor element is hermetically sealed in a housing and the anode lead is electrically connected to an external anode termination that is then connected to the external anode termination of a second capacitor assembly.

Besides having the capacitor assemblies electrically connected in a certain manner, the capacitor elements are also enclosed and hermetically sealed within separate housings in the presence of a gaseous atmosphere that contains an inert gas, thereby limiting the amount of oxygen and moisture supplied to the solid electrolyte of the capacitor elements. A plurality of capacitor assemblies can be connected in this manner further increasing the capacitance and efficiency of the module while maintaining the same footprint of a single capacitor assembly.

Various embodiments of the present invention will now be described in more detail.

I. Housing

The capacitor module of the present invention includes at least two capacitor assemblies, each assembly including at least one capacitor element sealed within a housing. In one embodiment, for example, one or more capacitor elements in each capacitor assembly may be hermetically sealed within a housing in the presence of a gaseous atmosphere that contains an inert gas, thereby further limiting the amount of moisture supplied to the solid electrolyte of the one or more capacitor elements.

The one or more capacitor elements may be sealed within a housing in various ways. For example, it may be desirable to enclose the capacitor element within a housing that remains separate and distinct. In this manner, the atmosphere of the housing may be gaseous and contain at least one inert gas, such as nitrogen, helium, argon, xenon, neon, krypton, radon, and so forth, as well as mixtures thereof. Typically, inert gases constitute the majority of the atmosphere within the housing, such as from about 50 wt. % to 100 wt. %, in some embodiments from about 75 wt. % to 100 wt. %, and in some embodiments, from about 90 wt. % to about 99 wt. % of the atmosphere. If desired, a relatively small amount of non-inert gases may also be employed, such as carbon dioxide, oxygen, water vapor, etc. In such cases, however, the non-inert gases typically constitute about 15 wt. % or less, in some embodiments about 10 wt. % or less, in some embodiments about 5 wt. % or less, in some embodiments about 1 wt. % or less, and in some embodiments, from about 0.01 wt. % to about 1 wt. % of the atmosphere within the housing.

Any of a variety of different materials may be used to form the housings, such as metals, plastics, ceramics, and so forth. In one embodiment, for example, the housings include one or more layers of a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. In another embodiment, the housings may include one or more layers of a ceramic material, such as aluminum nitride, aluminum oxide, silicon oxide, magnesium oxide, calcium oxide, glass, etc., as well as combinations thereof.

The housings may have any desired shape, such as cylindrical, D-shaped, rectangular, triangular, prismatic, etc. Referring to FIG. 1, for example, one embodiment of one capacitor assembly 100 is shown that contains a housing 122 and a capacitor element 120. In this particular embodiment, the housing 122 is generally rectangular. Typically, the housing and the capacitor element have the same or similar shape so that the capacitor element can be readily accommodated within the interior cavity. In the illustrated embodiment, for example, both the capacitor element 120 and the housing 122 have a generally rectangular shape.

If desired, the capacitor assemblies of the present invention may exhibit a relatively high volumetric efficiency. To facilitate such high efficiency, the capacitor element typically occupies a substantial portion of the volume of an interior cavity of the respective housing. For example, the capacitor element may occupy about 30 vol. % or more, in some embodiments about 50 vol. % or more, in some embodiments about 60 vol. % or more, in some embodiments about 70 vol. % or more, in some embodiments from about 80 vol. % to about 98 vol. %, and in some embodiments, from about 85 vol. % to 97 vol. % of the interior cavity of the respective housing. To this end, the difference between the dimensions of the capacitor element and those of the interior cavity defined by the respective housing are typically relatively small.

Referring to FIG. 1, for example, the capacitor element 120 may have a length (excluding the length of the anode lead 6) that is relatively similar to the length of an interior cavity 126 defined by the housing 122. For example, the ratio of the length of the anode to the length of the interior cavity ranges from about 0.40 to 1.00, in some embodiments from about 0.50 to about 0.99, in some embodiments from about 0.60 to about 0.99, and in some embodiments, from about 0.70 to about 0.98. The capacitor element 120 may have a length of from about 5 to about 10 millimeters, and the interior cavity 126 may have a length of from about 6 to about 15 millimeters. Similarly, the ratio of the height of the capacitor element 120 (in the −z direction) to the height of the interior cavity 126 may range from about 0.40 to 1.00, in some embodiments from about 0.50 to about 0.99, in some embodiments from about 0.60 to about 0.99, and in some embodiments, from about 0.70 to about 0.98. The ratio of the width of the capacitor element 120 (in the −x direction) to the width of the interior cavity 126 may also range from about 0.50 to 1.00, in some embodiments from about 0.60 to about 0.99, in some embodiments from about 0.70 to about 0.99, in some embodiments from about 0.80 to about 0.98, and in some embodiments, from about 0.85 to about 0.95. For example, the width of the capacitor element 120 may be from about 2 to about 7 millimeters and the width of the interior cavity 126 may be from about 3 to about 10 millimeters, and the height of the capacitor element 120 may be from about 0.5 to about 2 millimeters and the width of the interior cavity 126 may be from about 0.7 to about 6 millimeters.

The capacitor element may be attached to the housing in such a manner that an anode termination and cathode termination are formed external to the housing for subsequent attachment to a second capacitor assembly and/or integration into a circuit. The particular configuration of the terminations may depend on the intended application and will be discussed in more detail below. In one embodiment, for example, the capacitor assembly may be formed so that it is surface mountable, and yet still mechanically robust. For example, the anode lead may be electrically connected to external, surface mountable anode and cathode terminations (e.g., pads, sheets, plates, frames, etc.). Such terminations may extend through the housing to connect with the capacitor.

In certain embodiments, connective members may be employed within the interior cavity of the housing to facilitate connection to the terminations in a mechanically stable manner. For example, referring again to FIG. 1, the capacitor assembly 100 may include a connection member 162 that is formed from a first portion 167 and a second portion 165. The connection member 162 may be formed from conductive materials similar to the external terminations. The first portion 167 and second portion 165 may be integral or separate pieces that are connected together, either directly or via an additional conductive element (e.g., metal). In the illustrated embodiment, the second portion 165 is provided in a plane that is generally parallel to a lateral direction in which the lead 6 extends (e.g., −y direction). The first portion 167 is "upstanding" in the sense that it is provided in a plane that is generally perpendicular the lateral direction in which the lead 6 extends. In this manner, the first portion 167 can limit movement of the lead 6 in the horizontal direction to enhance surface contact and mechanical stability during use. If desired, an insulative material 7 (e.g., Teflon™ washer) may be employed around the lead 6.

The first portion 167 may possess a mounting region (not shown) that is connected to the anode lead 6. The region may have a "U-shape" for further enhancing surface contact and mechanical stability of the lead 6. Connection of the region to the lead 6 may be accomplished using any of a variety of known techniques, such as welding, laser welding, conductive adhesives, etc. In one particular embodiment, for example, the region is laser welded to the anode lead 6. Regardless of the technique chosen, however, the first portion 167 can hold the anode lead 6 in substantial horizontal alignment to further enhance the dimensional stability of the capacitor assembly 100.

Referring again to FIG. 1, one embodiment of the present invention is shown in which the connective member 162 and capacitor element 120 are connected to the housing 122 through anode and cathode terminations 127 and 129, respectively. More specifically, the housing 122 of this embodiment includes an outer wall 123 and two opposing sidewalls 124 between which a cavity 126 is formed that includes the capacitor element 120. The outer wall 123 and sidewalls 124 may be formed from one or more layers of a metal, plastic, or ceramic material such as described above. In this particular embodiment, the anode termination 127 contains a first region 127a that is positioned within the housing 122 and electrically connected to the connection member 162 and a second region 127b that is positioned external to the housing 122 and provides a mounting surface 201. Likewise, the cathode termination 129 contains a first region 129a that is positioned within the housing 122 and electrically connected to the solid electrolyte of the capacitor element 120 and a second region 129b that is positioned external to the housing 122 and provides a mounting surface 203. It should be understood that the entire portion of such regions need not be positioned within or external to the housing.

In the illustrated embodiment, a conductive trace 127c extends in the outer wall 123 of the housing to connect the first region 127a and second region 127b. Similarly, a conductive trace 129c extends in the outer wall 123 of the housing to connect the first region 127a and second region 127b. The conductive traces and/or regions of the terminations may be separate or integral. In addition to extending through the outer wall of the housing, the traces may also be positioned at other locations, such as external to the outer wall. Of course, the present invention is by no means limited to the use of conductive traces for forming the desired terminations.

Regardless of the particular configuration employed, connection of the terminations 127 and 129 to the capacitor element 120 may be made using any known technique, such as welding, laser welding, conductive adhesives, etc. In one particular embodiment, for example, a conductive adhesive 131 is used to connect the second portion 165 of the connection member 162 to the anode termination 127. Likewise, a conductive adhesive 133 is used to connect the cathode of the capacitor element 120 to the cathode termination 129.

Optionally, a restraint may also be disposed in contact with one or more surfaces of the capacitor element, such as the rear surface, front surface, upper surface, lower surface, side surface(s), or any combination thereof. The restraint can reduce the likelihood of delamination by the capacitor element from the housing. In this regard, the restraint may possess a certain degree of strength that allows it to retain the capacitor element in a relatively fixed positioned even when it is subjected to vibrational forces, yet is not so strong that it cracks. For example, the restraint may possess a tensile strength of from about 1 to about 150 Megapascals ("MPa"), in some embodiments from about 2 to about 100 MPa, in some embodiments from about 10 to about 80 MPa, and in some embodiments, from about 20 to about 70 MPa, measured at a temperature of about 25° C. It is normally desired that the restraint is not electrically conductive. Referring again to FIG. 1, for instance, one embodiment is shown in which a single restraint 197 is disposed in contact with an upper surface 181 and rear surface 177 of the capacitor element 120. While a single restraint is shown in FIG. 1, it should be understood that separate restraints may be employed to accomplish the same function. In fact, more generally, any number of restraints may be employed to contact any desired surface of the capacitor element. When multiple restraints are employed, they may be in contact with each other or remain physically separated. For example, in one embodiment, a second restraint (not shown) may be employed that contacts the upper surface 181 and front surface 179 of the capacitor element 120. The first restraint 197 and the second restraint (not shown) may or may not be in contact with each other. In yet another embodiment, a restraint may also contact a lower surface 183 and/or side surface(s) of the capacitor element 120, either in conjunction with or in lieu of other surfaces.

Regardless of how it is applied, it is typically desired that the restraint is also in contact with at least one surface of the housing to help further mechanically stabilize the capacitor element against possible delamination. For example, the restraint may be in contact with an interior surface of one or more sidewall(s), outer wall, lid, etc. In FIG. 1, for example, the polymeric restraint 197 is in contact with an interior surface 107 of sidewall 124 and an interior surface 109 of outer wall 123. While in contact with the housing, it is nevertheless desired that at least a portion of the cavity defined by the housing remains unoccupied to allow for the inert gas to flow through the cavity and limit contact of the solid electrolyte with oxygen. For example, at least about 5% of the cavity volume typically remains unoccupied by the capacitor element and polymer restraint, and in some embodiments, from about 10% to about 50% of the cavity volume.

Once connected in the desired manner, the resulting package is hermetically sealed as described above. Referring again to FIG. 1, for instance, the housing 122 may also include a lid 125 that is placed on an upper surface of side walls 124 after the capacitor element 120 and the polymer restraint 197 are positioned within the housing 122. The lid 125 may be formed from a ceramic, metal (e.g., iron, copper, nickel, cobalt, etc., as well as alloys thereof), plastic, and so forth. If desired, a sealing member 187 may be disposed between the lid 125 and the side walls 124 to help provide a good seal. In one embodiment, for example, the sealing member may include a glass-to-metal seal, Kovar® ring (Goodfellow Camridge, Ltd.), etc. The height of the side walls 124 is generally such that the lid 125 does not contact any surface of the capacitor element 120 so that it is not contaminated. The restraint 197 may or may not contact the lid 125. When placed in the desired position, the lid 125 is hermetically sealed to the sidewalls 124 using known techniques, such as welding (e.g., resistance welding, laser welding, etc.), soldering, etc. Hermetic sealing generally occurs in the presence of inert gases as described above so that the resulting assembly is substantially free of reactive gases, such as oxygen or water vapor.

Figure 2:
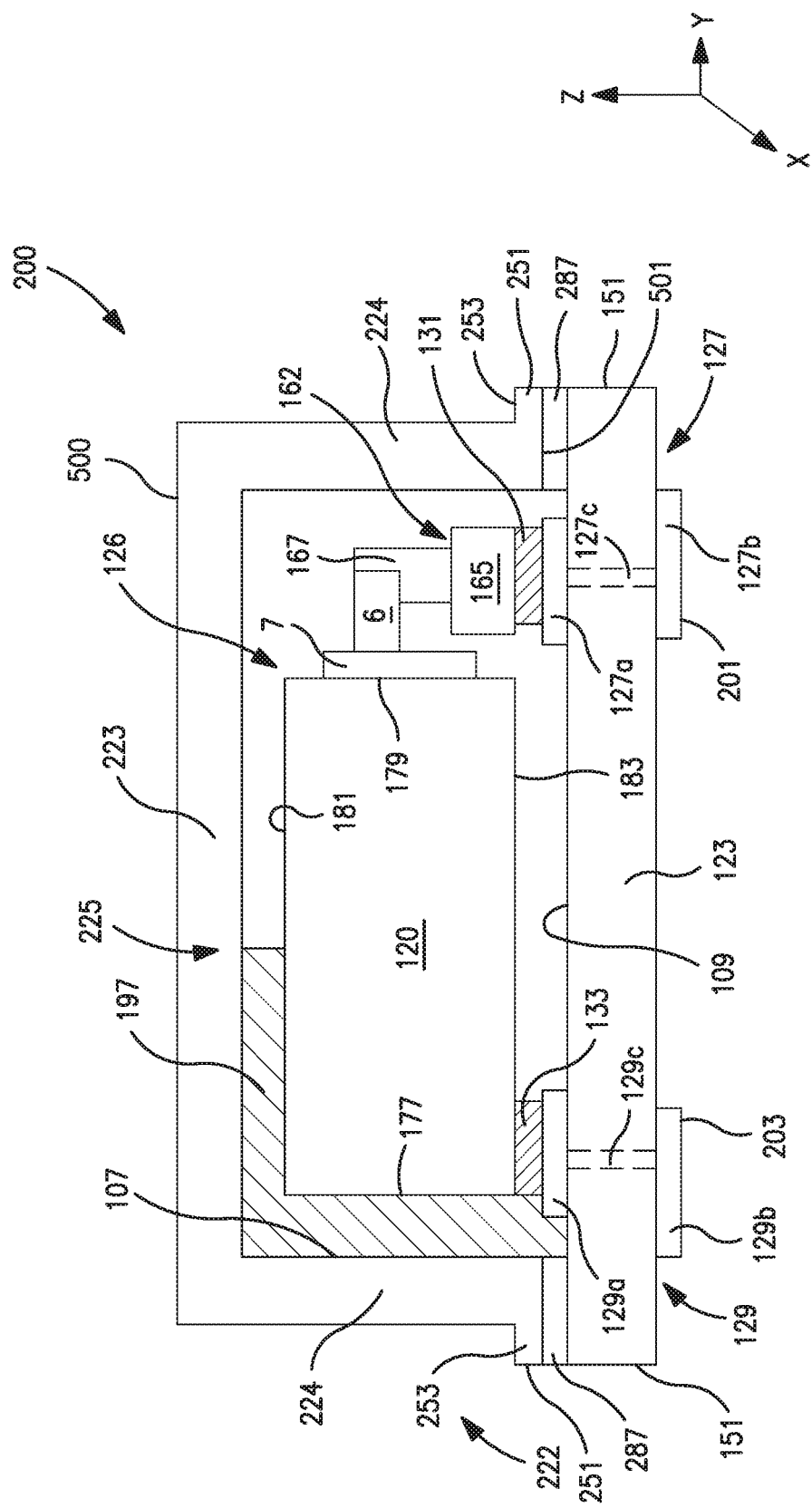
FIG. 2 is a cross-sectional view of another embodiment of a capacitor assembly of the module of the present invention.

It should be understood that the embodiments described are only exemplary, and that various other configurations may be employed in the present invention for hermetically sealing a capacitor element within a housing. Referring to FIG. 2, for instance, another embodiment of a capacitor assembly 200 of the present module is shown that employs a housing 222 that includes an outer wall 123 and a lid 225, between which a cavity 126 is formed that includes the capacitor element 120 and polymeric restraint 197. The lid 225 includes an outer wall 223 that is integral with at least one sidewall 224. In the illustrated embodiment, for example, two opposing sidewalls 224 are shown in cross-section. The outer walls 223 and 123 both extend in a lateral direction (−y direction) and are generally parallel with each other and to the lateral direction of the anode lead 6. The sidewall 224 extends from the outer wall 223 in a longitudinal direction that is generally perpendicular to the outer wall 123. A distal end 500 of the lid 225 is defined by the outer wall 223 and a proximal end 501 is defined by a lip 253 of the sidewall 224.

The lip 253 extends from the sidewall 224 in the lateral direction, which may be generally parallel to the lateral direction of the outer wall 123. The angle between the sidewall 224 and the lip 253 may vary, but is typically from about 60° to about 120°, in some embodiments from about 70° to about 1100, and in some embodiments, from about 80° to about 100° (e.g., about 90°). The lip 253 also defines a peripheral edge 251, which may be generally perpendicular to the lateral direction in which the lip 253 and outer wall 123 extend. The peripheral edge 251 is located beyond the outer periphery of the sidewall 224 and may be generally coplanar with an edge 151 of the outer wall 123. The lip 253 may be sealed to the outer wall 123 using any known technique, such as welding (e.g., resistance or laser), soldering, glue, etc. For example, in the illustrated embodiment, a sealing member 287 is employed (e.g., glass-to-metal seal, Kovar® ring, etc.) between the components to facilitate their attachment. Regardless, the use of a lip described above can enable a more stable connection between the components and improve the seal and mechanical stability of the capacitor assembly.

Figure 3:
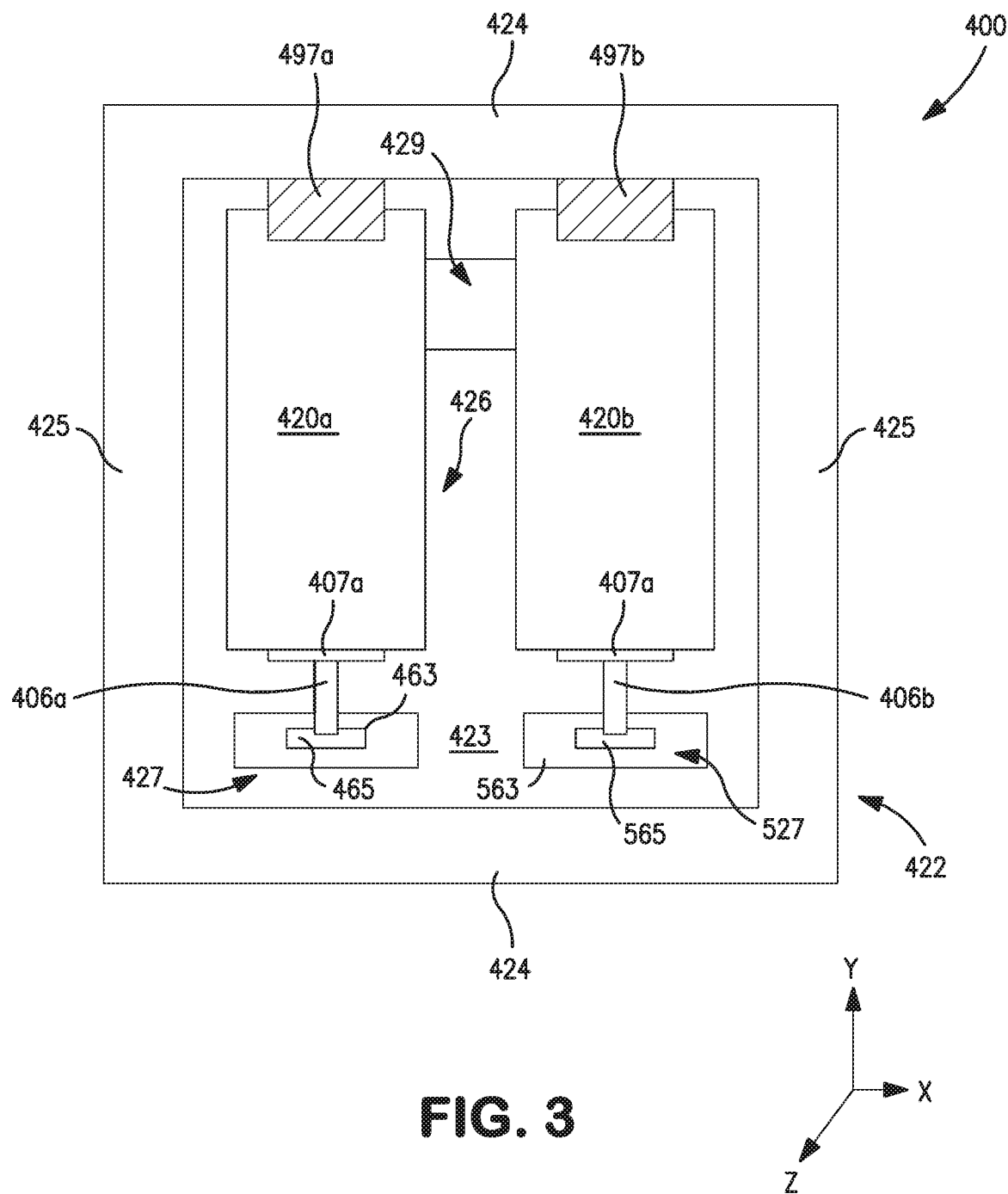
FIG. 3 is a cross-sectional view of yet another embodiment of a capacitor assembly of the module of the present invention.

The embodiments shown in FIGS. 1-2 are discussed herein in terms of only a single capacitor element. It should also be understood, however, that multiple capacitor elements may also be hermetically sealed within a single housing. The multiple capacitor elements may be attached to the housing using any of a variety of different techniques. Referring to FIG. 3, for example one particular embodiment of a capacitor assembly 400 of the present module is shown that contains two capacitor elements and will now be described in more detail. More particularly, the capacitor assembly 400 includes a first capacitor element 420a in electrical communication with a second capacitor element 420b. In this embodiment, the capacitor elements are aligned so that their major surfaces are in a horizontal configuration. That is, a major surface of the capacitor element 420a defined by its width (−x direction) and length (−y direction) is positioned adjacent to a corresponding major surface of the capacitor element 420b. Thus, the major surfaces are generally coplanar. Alternatively, the capacitor elements may be arranged so that their major surfaces are not coplanar, but perpendicular to each other in a certain direction, such as the −z direction or the −x direction. Of course, the capacitor elements need not extend in the same direction.

The capacitor elements 420a and 420b are positioned within a housing 422 that contains an outer wall 423 and sidewalls 424 and 425 that together define a cavity 426. Although not shown, a lid may be employed that covers the upper surfaces of the sidewalls 424 and 425 and seals the assembly 400 as described above. Optionally, a polymeric restraint may also be employed to help limit the vibration of the capacitor elements. In FIG. 3, for example, separate polymer restraints 497a and 497b are positioned adjacent to and in contact with the capacitor elements 420a and 420b, respectively. The polymer restraints 497a and 497b may be positioned in a variety of different locations. Further, one of the restraints may be eliminated, or additional restraints may be employed. In certain embodiments, for example, it may be desired to employ a polymeric restraint between the capacitor elements to further improve mechanical stability. In addition to the capacitor elements, the capacitor assembly also contains an anode termination to which anode leads of respective capacitor elements are electrically connected and a cathode termination to which the cathodes of respective capacitor elements are electrically connected. Referring again to FIG. 3, for example, the capacitor elements are shown connected in parallel to a common cathode termination 429. In this particular embodiment, the cathode termination 429 is initially provided in a plane that is generally parallel to the bottom surface of the capacitor elements and may be in electrical contact with conductive traces (not shown). The capacitor assembly 400 also includes connective members 427 and 527 that are connected to anode leads 406a and 406b, respectively, of the capacitor elements 420a and 420b. More particularly, the connective member 427 contains an upstanding portion 465 and a planar portion 463 that is in connection with an anode termination (not shown). Likewise, the connective member 527 contains an upstanding portion 565 and a planar portion 563 that is in connection with an anode termination (not shown). Of course, it should be understood that a wide variety of other types of connection mechanisms may also be employed. If desired, insulative material 407a and 407b (e.g., Teflon™ washer) may be employed around the leads 406a and 406b, respectively.

II. Terminations

As mentioned above, the capacitor element may be provided with terminations, particularly when employed in surface mounting applications. For example, the capacitor assembly may contain an anode termination to which an anode lead of the capacitor element is electrically connected and a cathode termination to which the cathode of the capacitor element is electrically connected. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters. One exemplary conductive material is a copper-iron alloy metal plate available from Wieland (Germany). If desired, the surface of the terminations may be electroplated with nickel, silver, gold, tin, etc. as is known in the art to ensure that the final part is mountable to the circuit board. In one particular embodiment, both surfaces of the terminations are plated with nickel and silver flashes, respectively, while the mounting surface is also plated with a tin solder layer. In another embodiment, the termination(s) are deposited with thin outer metal layers (e.g., gold) onto a base metal layer (e.g., copper alloy) to further increase conductivity.

The terminations may be connected to the capacitor element using any technique known in the art. In one embodiment, for example, a lead frame may be provided that defines the cathode termination and anode termination. To attach the electrolytic capacitor element to the lead frame, a conductive adhesive may initially be applied to a surface of the cathode termination. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and compound (e.g., silane compounds). Suitable conductive adhesives may be described in U.S. Patent Application Publication No. 2006/0038304 to Osako, et al. Any of a variety of techniques may be used to apply the conductive adhesive to the cathode termination. Printing techniques, for instance, may be employed due to their practical and cost-saving benefits. The anode lead may also be electrically connected to the anode termination using any technique known in the art, such as mechanical welding, laser welding, conductive adhesives, etc. Upon electrically connecting the anode lead to the anode termination, the conductive adhesive may then be cured to ensure that the electrolytic capacitor element is adequately adhered to the cathode termination.

The external anode terminations of each of the capacitor assemblies in the capacitor module are electrically connected and the external cathode terminations of each of the capacitor assemblies are electrically connected. The terminations may be connected by various methods, such as by a first metal plate attached to the anode terminations and a second metal plate attached to the cathode terminations. The plate may be attached to the terminations by various techniques, such as welding, laser welding, conductive adhesives, etc. In some embodiments, the adjoining capacitor assemblies are configured such that the external anode terminations are disposed on one side of the module and the external cathode terminations are disposed on another side of the module, such as on the opposite side of the module.

In certain embodiments, the external terminations can extend outwardly beyond the outer perimeter of a surface of the housing to increase the degree of surface contact between the metal plate and the respective termination. For example, in some embodiments, the lower surface of the housing may have an outer periphery defined by its length in the longitudinal direction (e.g., direction in which the anode lead extends) and width in the transverse direction. In such embodiments, one or more of the external terminations may extend beyond the periphery of the lower surface of the housing in the transverse direction. Alternatively or in addition to the transverse direction, one or more of the external terminations may also extend beyond the outer periphery in the longitudinal direction. In some embodiments, the external terminations extend past a wall of the housing and wrap the corner of the wall such that the terminations are exposed on two sides of the housing. One or more external terminations may be folded or bent upwards so that the external termination forms a "J" or "L" shape, resulting in a termination that is adjacent to both the lower surface of the capacitor and either an outer wall or sidewall of the capacitor. Such embodiments may improve the electrical connection to the respective metal plate and the second capacitor assembly. It is believed that the "J" or "L"-shaped configurations of the external anode and cathode terminations contributes to the mechanical stability to the capacitor assembly under extreme conditions.

Figure 4A:
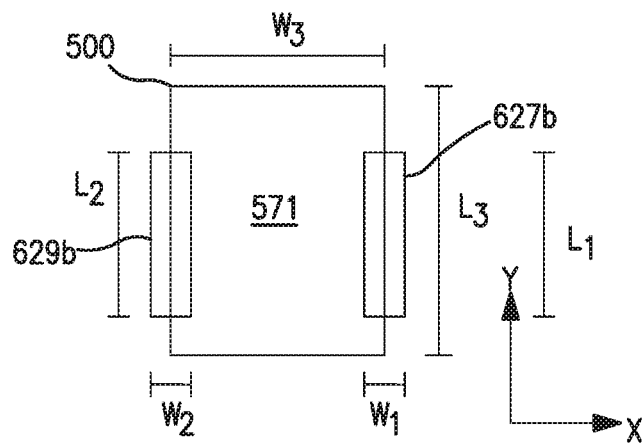
FIG. 4a is a top view of another embodiment of a capacitor assembly of the module of the present invention.

Referring again to FIGS. 1-2, for instance, one particular embodiment is shown in which the housing 122, 222 defines a lower surface 171, 271. The lower surface in various embodiments is further shown in FIGS. 4-6. For instance, FIGS. 4-6 illustrate various embodiments where the external terminations extend past a wall of the housing and wrap the corner of the wall such that the terminations are exposed on two sides of the housing. FIGS. 4a, 5a, and 6a illustrate the lower surface in various embodiments of the present invention where the external terminations extend past a wall of the housing. For instance, FIG. 4a illustrates an external anode termination 627b and external cathode termination 629b that extend beyond the outer periphery 500 of the lower surface 517. The lower surface 571 has an outer periphery 500 defined by its length along the −y axis (e.g., longitudinal direction) and width along the −x axis (e.g., transverse direction). As shown, the external anode termination portion 627b and the external cathode termination portion 629b are located adjacent to the lower surface 571 and extend beyond the periphery 500 along the −x axis. The portions 627b and/or 629b may also extend in other various directions beyond the periphery 500, such as along the −y axis. Further, it should also be understood that an external termination portion may also extend from other surfaces of the housing besides the lower surface, such as the upper surface, rear surface, etc. Typically, however, at least one of the external termination portions is provided in a plane that is generally parallel to the housing surface to which it is adjacent. For example, in the embodiment shown in FIG. 4a, the external anode termination portion 627b and the external cathode termination 629b are provided in a plane that is generally parallel to the lower surface 571 of the housing.

Figure 4B:
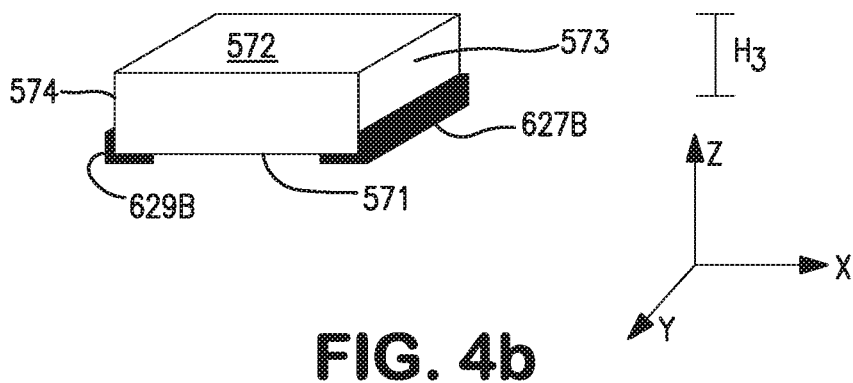
FIG. 4b is a perspective view of the capacitor assembly of FIG. 4a of the module of the present invention.
Figure 4C:
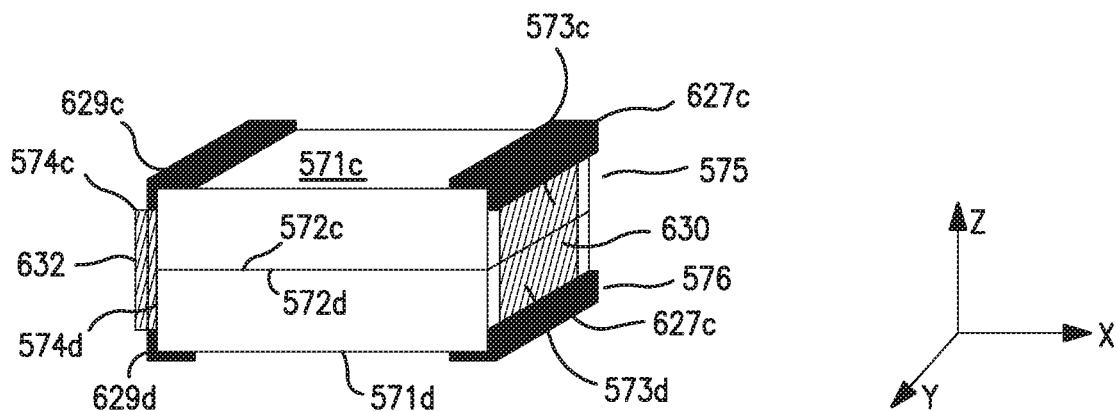
FIG. 4c is a perspective view of an embodiment of a module of the present invention.
Figure 5A:
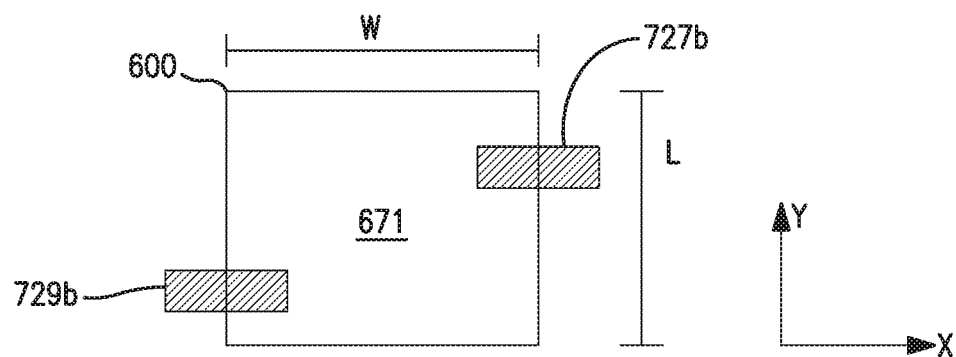
FIG. 5a is a top view of another embodiment of a capacitor assembly of the module of the present invention.

FIG. 4b illustrates the wrapping of the external terminations along the sides of the housing. The external anode termination 627b wraps the corner of the housing such that it is disposed on both the lower surface 571 and the side surface 573. The external cathode termination 629b wraps the corner of the housing such that it is disposed on both the lower surface 571 and the side surface 574. FIG. 4c illustrates the vertical stacking of two capacitor assemblies. As shown in FIG. 4c, the first capacitor assembly 575 is disposed above the second capacitor assembly 576. The first capacitor assembly 575 includes a lower surface 571c and an upper surface 572c as well as side surfaces 573c and 574c. The first capacitor assembly 575 also includes an external anode termination 627c and an external cathode termination 629c. The second capacitor assembly 576 includes a lower surface 571d and an upper surface 572d as well as side surfaces 573d and 574d. The second capacitor assembly 576 also includes an external anode termination 627d and an external cathode termination 629d. In the embodiment illustrated in FIG. 4c, the first capacitor assembly 575 is inverted over the second capacitor assembly 576 such that the external anode terminations 627c, 627d and the external cathode terminations 629c, 629d are disposed on the corners of the capacitor module. The capacitor assemblies 575, 576 are stacked on major surfaces of the assemblies (e.g., 572c, 572d). In this embodiment, the capacitor assemblies 575, 576 are aligned so that their major surfaces (i.e., surfaces with the largest surface area) are in a vertical configuration. A major surface of the capacitor assembly 575 defined by its width (−x direction) and length (−y direction) is positioned on top of and immediately adjacent to a corresponding major surface of the capacitor assembly 576. Thus, the major surfaces are disposed in planes that are generally parallel. A first plate 630 is attached to the external anode terminations 627c, 629d and electrically connects the terminations. A second plate 632 is attached to the external cathode terminations 629c, 629d and electrically connects the terminations.

In the embodiment shown in FIG. 4a, the external anode and cathode termination portions are generally continuous along the longitudinal dimension (e.g., in the −y direction) of the housing surface 571. However, this is not necessarily desired in all embodiments. Referring to FIG. 5a, for example, an alternative embodiment is illustrated in which the external termination portions 727b and 729b extend along only a portion of the longitudinal dimension of the housing surface but nevertheless extend beyond the periphery 600 in two opposite directions (e.g., along the −x axis). In particular, FIG. 5a illustrates an external anode termination 727b and external cathode termination 729b that extend beyond the outer periphery 600 of the lower surface 617. The lower surface 671 has an outer periphery 600 defined by its length along the −y axis (e.g., longitudinal direction) and width along the −x axis (e.g., transverse direction). As shown, the external anode termination portion 727b and the external cathode termination portion 729b are located adjacent to the lower surface 671 and extend beyond the periphery 600 along the −x axis. The portions 727b and/or 729b may also extend in other various directions beyond the periphery 600, such as along the −y axis. In the embodiment shown in FIG. 5a, the external anode termination portion 727b and the external cathode termination 729b are provided in a plane that is generally parallel to the lower surface 671 of the housing.

Figure 5B:
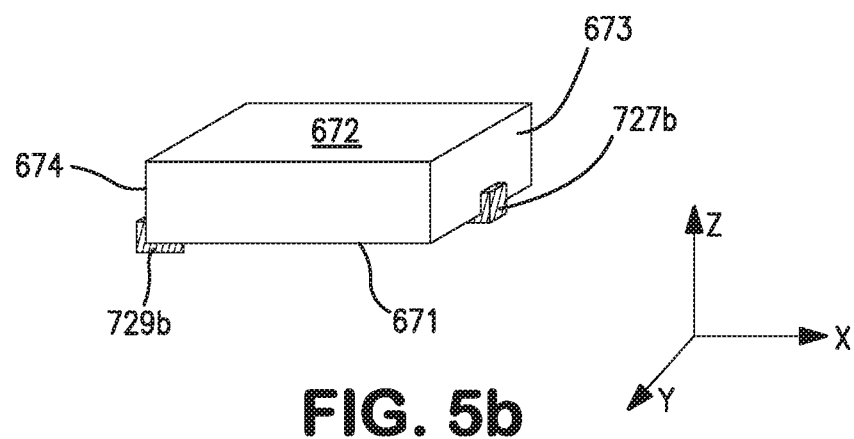
FIG. 5b is a perspective view of the capacitor assembly of FIG. 5a of the module of the present invention.
Figure 5C:
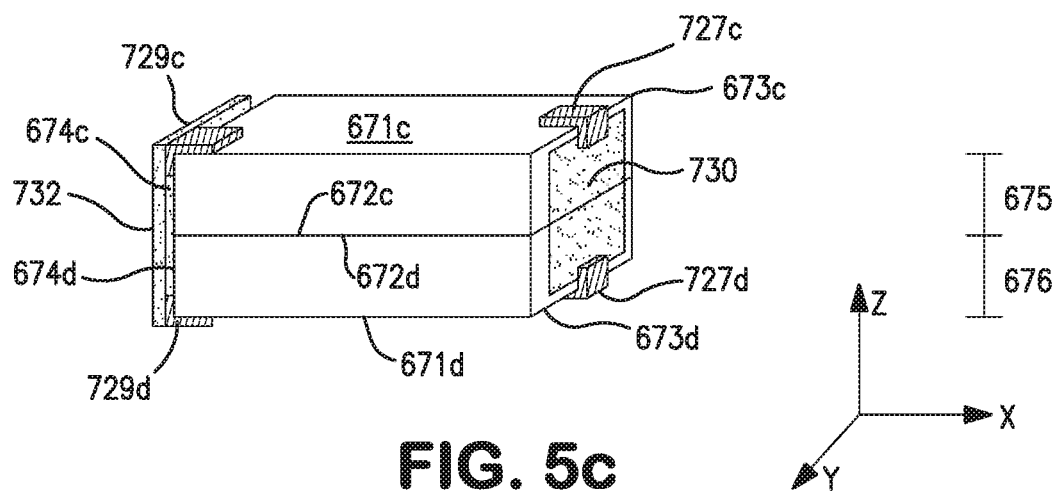
FIG. 5c is a perspective view of an embodiment of a module of the present invention.
Figure 6A:
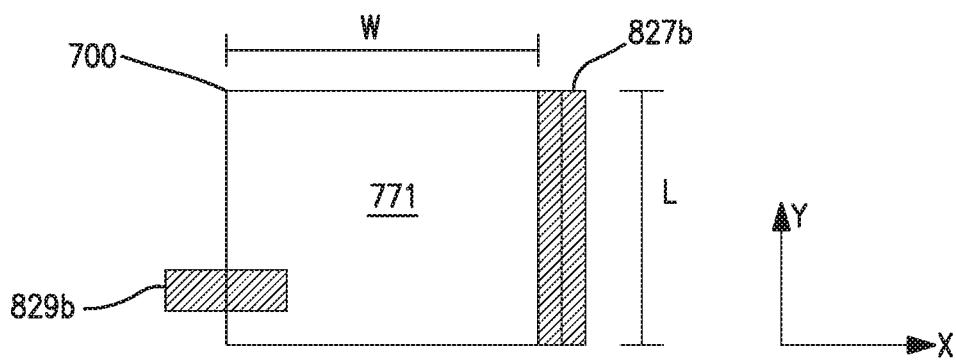
FIG. 6a is a top view of another embodiment of a capacitor assembly of the module of the present invention.

FIG. 5b illustrates the wrapping of the external terminations of FIG. 5a along the sides of the housing. The external anode termination 727b wraps the corner of the housing such that it is disposed on both the lower surface 671 and the side surface 673. The external cathode termination 729b wraps the corner of the housing such that it is disposed on both the lower surface 671 and the side surface 674. FIG. 5c illustrates the vertical stacking of two capacitor assemblies. As shown in FIG. 5c, the first capacitor assembly 675 is disposed above the second capacitor assembly 676. The first capacitor assembly 675 includes a lower surface 671c and an upper surface 672c as well as side surfaces 673c and 674c. The first capacitor assembly 675 also includes an external anode termination 727c and an external cathode termination 729c. The second capacitor assembly 676 includes a lower surface 671d and an upper surface 672d as well as side surfaces 673d and 674d. The second capacitor assembly 676 also includes an external anode termination 727d and an external cathode termination 729d. In the embodiment illustrated in FIG. 5c, the first capacitor assembly 676 is inverted over the second capacitor assembly 676 such that the external anode terminations 727c, 727d and the external cathode terminations 729c, 729d are disposed on the corners of the capacitor module. The capacitor assemblies 675, 676 are stacked on major surfaces of the assemblies (e.g., 672c, 672d). A first plate 730 is attached to the external anode terminations 727c, 729d and electrically connects the terminations. A second plate 732 is attached to the external cathode terminations 729c, 729d and electrically connects the terminations.

Similar to FIGS. 4a and 5a, FIG. 6a illustrates an external anode termination 827b and external cathode termination 829b that extend beyond the outer periphery 700 of the lower surface 717. The lower surface 771 has an outer periphery 700 defined by its length along the −y axis (e.g., longitudinal direction) and width along the −x axis (e.g., transverse direction). As shown, the external anode termination portion 827b and the external cathode termination portion 829b are located adjacent to the lower surface 771 and extend beyond the periphery 700 along the −x axis. The portions 827b and/or 829b may also extend in other various directions beyond the periphery 700, such as along the −y axis. In the embodiment shown in FIG. 6a, the external anode termination portion 827b and the external cathode termination 829b are provided in a plane that is generally parallel to the lower surface 771 of the housing. The external cathode termination 829b extends along a portion of the longitudinal dimension of the housing surface but nevertheless extends beyond the periphery 700 in an opposite direction (e.g., along the −x axis) from the external anode termination 827b. In other embodiments, the external anode termination 827b may extend along a portion of the longitudinal dimension of the housing surface but nevertheless extends beyond the periphery 700 in an opposite direction (e.g., along the −x axis) from the external cathode termination 829b, which is continuous along the longitudinal dimension of the housing surface.

Figure 6B:
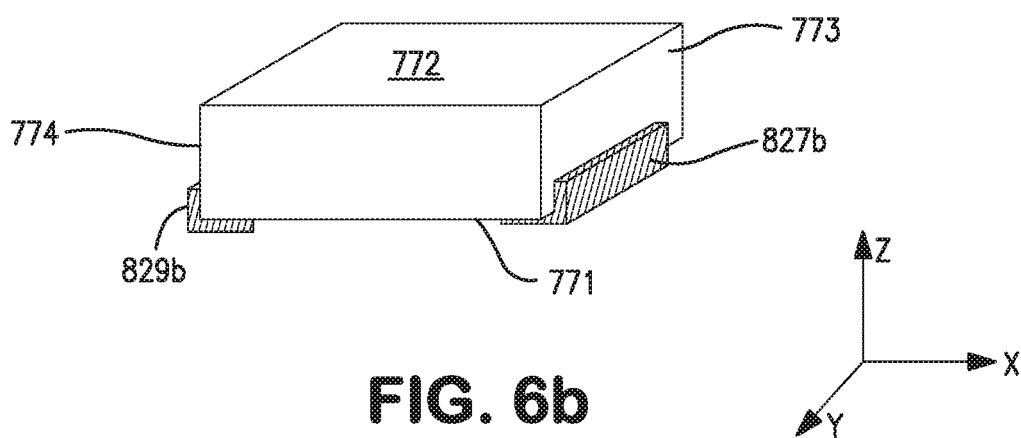
FIG. 6b is a perspective view of the capacitor assembly of FIG. 6a of the module of the present invention.
Figure 6C:
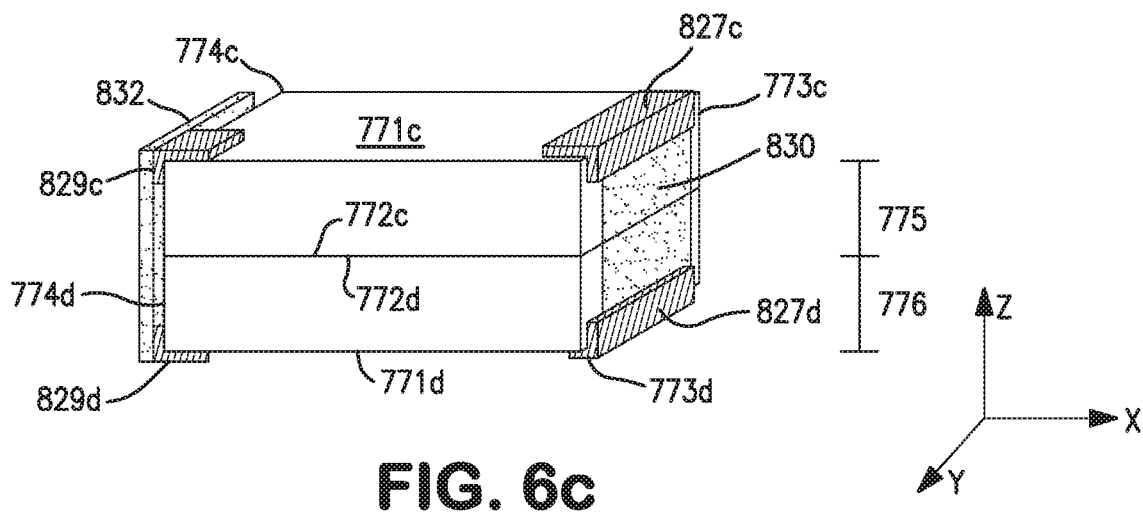
FIG. 6c is a perspective view of an embodiment of a module of the present invention.

FIG. 6b illustrates the wrapping of the external terminations of FIG. 6a along the sides of the housing. The external anode termination 827b wraps the corner of the housing such that it is disposed on both the lower surface 771 and the side surface 773. The external cathode termination 829b wraps the corner of the housing such that it is disposed on both the lower surface 771 and the side surface 774. FIG. 6c illustrates the vertical stacking of two capacitor assemblies. As shown in FIG. 6c, the first capacitor assembly 775 is disposed above the second capacitor assembly 776. The first capacitor assembly 775 includes a lower surface 771c and an upper surface 772c as well as side surfaces 773c and 774c. The first capacitor assembly 775 also includes an external anode termination 827c and an external cathode termination 829c. The second capacitor assembly 776 includes a lower surface 771d and an upper surface 772d as well as side surfaces 773d and 774d. The second capacitor assembly 776 also includes an external anode termination 827d and an external cathode termination 829d. In the embodiment illustrated in FIG. 6c, the first capacitor assembly 775 is inverted over the second capacitor assembly 776 such that the external anode terminations 827c, 827d and the external cathode terminations 829c, 829d are disposed on the corners of the capacitor module. The capacitor assemblies 675, 676 are stacked on major surfaces of the assemblies (e.g., 672c, 672d). A first plate 830 is attached to the external anode terminations 827c, 829d and electrically connects the terminations. A second plate 832 is attached to the external cathode terminations 829c, 829d and electrically connects the terminations.

As indicated above, the degree to which the external anode termination portion and/or external cathode termination portion extends beyond the outer periphery of a housing surface and wraps the housing is selectively controlled in the present invention to achieve a balance between increased stability, reduced circuit board footprint, and connection to the adjacent capacitor assembly.

Referring again to FIG. 4a, for instance, the external anode termination portion 627b extends a first distance "$W_1$" (e.g., in the −x direction) beyond the periphery 500 and the external cathode termination portion 629b extends a second distance "$W_2$" (e.g., in the −x direction) beyond the periphery 500. The distances $W_1$ and $W_2$ may be the same or different. Typically, the ratio of the distance W and/or the distance $W_2$ to the dimension "$W_3$" of the surface 571 of the housing in the same direction (e.g., width in the −x direction) is typically from about 0.05 to about 3.0, in some embodiments from about 0.1 to about 2.5, and in some embodiments, 0.15 to about 2.0. In fact, in certain embodiments, it may be desired that the distance $W_1$ and/or $W_2$ is even greater than the dimension $W_3$ so that the aforementioned "ratio" is greater than 1. For instance, the distance $W_1$ and/or the distance $W_2$ may be from about 0.25 to about 50 millimeters, in some embodiments from about 0.5 to about 40 millimeters, and in some embodiments, from about 1 to about 20 millimeters, while the housing dimension $W_3$ may likewise be from about 0.5 to about 40 millimeters, in some embodiments from about 2 to about 30 millimeters, and in some embodiments, from about 5 to about 25 millimeters.

In the embodiment shown in FIG. 4c, each of the external anode terminations 627c, 627d extend the distance "$W_1$" beyond the periphery 500 and each of the external cathode terminations 629c, 629d extend a distance "$W_2$" beyond the periphery 500. In such cases, the values for $W_1$ and/or $W_2$ may be the same or different on each of the capacitor assemblies.

The external termination portions 627b and 629b may also have dimensions "$L_1$" and "$L_2$" (e.g., in the −y direction) that are perpendicular to the dimensions W and $W_2$, respectively. The longitudinal dimensions may, for example, range from about 0.1 to about 10 millimeters, in some embodiments from about 0.2 to about 8 millimeters, and in some embodiments, from about 0.5 to about 5 millimeters, while the housing dimension $L_3$ (e.g., length in the −y direction) may be from about 2 to about 30 millimeters, in some embodiments from about 3 to about 20 millimeters, and in some embodiments, from about 4 to about 15 millimeters. The thickness of the terminations may also be selected to enhance stability while still minimizing the thickness of the overall capacitor assembly. For instance, the thickness may range from about 0.1 to about 10 millimeters, in some embodiments from about 0.2 to about 8 millimeters, and from about 1 to about 5 millimeters. If desired, the surface of the terminations may be electroplated with nickel, silver, gold, tin, etc. as is known in the art to ensure that the final part is mountable to the circuit board. In one particular embodiment, the termination(s) are deposited with nickel and silver flashes, respectively, and the mounting surface is also plated with a tin solder layer. In another embodiment, the termination(s) are deposited with thin outer metal layers (e.g., gold) onto a base metal layer (e.g., copper alloy) to further increase conductivity.

Further, in FIG. 4(a) through 6(c), a dimension H is shown that corresponds with the height of the sidewall of the housing assembly that is perpendicular to lower surface. Regardless of the value of dimension H, it is to be understood that the distances $W_1$ and/or $W_2$ may be less than, greater than, or equal to the dimension H. For instance, the ratio of the distance $W_1$ and/or $W_2$ to the dimension H of sidewall of housing when the external anode and cathode termination portions are folded onto the sidewall can be from about 0.1 to about 2, such as from 0.15 to about 1.5, such as from 0.2 to about 1.0. Thus, when the external anode and cathode terminations are folded or bent so that the portions or sides represented by distances $W_1$ and $W_2$ are adjacent to or in contact with the sidewalls and perpendicular to the lower surface, the termination portions may extend against the sidewall for a distance that is less than the dimension H of the sidewall, may extend against the sidewall for a distance that is equal to the dimension H, or may extend beyond the dimension H. In any event, the resulting "J" or "L" shaped configuration of the external anode and cathode terminations due to folding or bending at least one side of the external termination portions against the sidewalls of housings enhances the mechanical stability of the disclosed capacitor and improves the connections to the metal plates and thereby to the adjacent capacitor assembly.

As shown in FIGS. 4c, 5c, and 6c, two capacitor assemblies may be vertically stacked and electrically connected to improve the capacitance and efficiency of the capacitor module while maintaining the footprint of a single capacitor assembly. In some embodiments, a plurality of capacitor assemblies may be vertically stacked and electrically connected. In such embodiments, a metal plate as used herein may also be used to electrically connect external anode terminations and a second plate may be used to electrically connect external cathode terminations.

III. Capacitor Elements

A. Anode

Each capacitor element of the capacitor assemblies in the capacitor module includes an anode that contains a dielectric formed on a sintered porous body. The porous anode body may be formed from a powder that contains a valve metal (i.e., metal that is capable of oxidation) or valve metal-based compound, such as tantalum, niobium, aluminum, hafnium, titanium, alloys thereof, oxides thereof, nitrides thereof, and so forth. The powder is typically formed from a reduction process in which a tantalum salt (e.g., potassium fluotantalate ($K_2TaF_7$), sodium fluotantalate ($Na_2TaF_7$), tantalum pentachloride ($TaCl_5$), etc.) is reacted with a reducing agent. The reducing agent may be provided in the form of a liquid, gas (e.g., hydrogen), or solid, such as a metal (e.g., sodium), metal alloy, or metal salt. In one embodiment, for instance, a tantalum salt (e.g., $TaCl_5$) may be heated at a temperature of from about 900° C. to about 2,000° C., in some embodiments from about 1,000° C. to about 1,800° C., and in some embodiments, from about 1,100° C. to about 1,600° C., to form a vapor that can be reduced in the presence of a gaseous reducing agent (e.g., hydrogen). Additional details of such a reduction reaction may be described in WO 2014/199480 to Maeshima, et al. After the reduction, the product may be cooled, crushed, and washed to form a powder.

The specific charge of the powder typically varies from about 2,000 to about 800,000 microFarads*Volts per gram ("$\mu F*V/g$") depending on the desired application. For instance, in certain embodiments, a high charge powder may be employed that has a specific charge of from about 100,000 to about 800,000 $\mu F*V/g$, in some embodiments from about 120,000 to about 700,000 $\mu F*V/g$, and in some embodiments, from about 150,000 to about 600,000 $\mu F*V/g$. In other embodiments, a low charge powder may be employed that has a specific charge of from about 2,000 to about 100,000 $\mu F*V/g$, in some embodiments from about 5,000 to about 80,000 $\mu F*V/g$, and in some embodiments, from about 10,000 to about 70,000 $\mu F*V/g$. As is known in the art, the specific charge may be determined by multiplying capacitance by the anodizing voltage employed, and then dividing this product by the weight of the anodized electrode body.

The powder may be a free-flowing, finely divided powder that contains primary particles. The primary particles of the powder generally have a median size (D50) of from about 5 to about 250 nanometers, in some embodiments from about 10 to about 200 nanometers, and in some embodiments, from about 20 to about 150 nanometers, such as determined using a laser particle size distribution analyzer made by BECKMAN COULTER Corporation (e.g., LS-230), optionally after subjecting the particles to an ultrasonic wave vibration of 70 seconds. The primary particles typically have a three-dimensional granular shape (e.g., nodular or angular). Such particles typically have a relatively low "aspect ratio", which is the average diameter or width of the particles divided by the average thickness ("D/T"). For example, the aspect ratio of the particles may be about 4 or less, in some embodiments about 3 or less, and in some embodiments, from about 1 to about 2. In addition to primary particles, the powder may also contain other types of particles, such as secondary particles formed by aggregating (or agglomerating) the primary particles. Such secondary particles may have a median size (D50) of from about 1 to about 500 micrometers, and in some embodiments, from about 10 to about 250 micrometers.

Agglomeration of the particles may occur by heating the particles and/or through the use of a binder. For example, agglomeration may occur at a temperature of from about 0° C. to about 40° C., in some embodiments from about 5° C. to about 35° C., and in some embodiments, from about 15° C. to about 30° C. Suitable binders may likewise include, for instance, poly(vinyl butyral); poly(vinyl acetate); poly(vinyl alcohol); poly(vinyl pyrollidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; acrylic polymers, such as sodium polyacrylate, poly(lower alkyl acrylates), poly (lower alkyl methacrylates) and copolymers of lower alkyl acrylates and methacrylates; and fatty acids and waxes, such as stearic and other soapy fatty acids, vegetable wax, microwaxes (purified paraffins), etc.

The resulting powder may be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead, which may be in the form of a wire, sheet, etc. The lead may extend in a longitudinal direction from the anode body and may be formed from any electrically conductive material, such as tantalum, niobium, aluminum, hafnium, titanium, etc., as well as electrically conductive oxides and/or nitrides of thereof. Connection of the lead may also be accomplished using other known techniques, such as by welding the lead to the body or embedding it within the anode body during formation (e.g., prior to compaction and/or sintering).

Any binder may be removed after pressing by heating the pellet under vacuum at a certain temperature (e.g., from about 150° C. to about 500° C.) for several minutes. Alternatively, the binder may also be removed by contacting the pellet with an aqueous solution, such as described in U.S. Pat. No. 6,197,252 to Bishop, et al. Thereafter, the pellet is sintered to form a porous, integral mass. The pellet is typically sintered at a temperature of from about 700° C. to about 1600° C., in some embodiments from about 800° C. to about 1500° C., and in some embodiments, from about 900° C. to about 1200° C., for a time of from about 5 minutes to about 100 minutes, and in some embodiments, from about 8 minutes to about 15 minutes. This may occur in one or more steps. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

B. Dielectric

The anode is also coated with a dielectric. The dielectric may be formed by anodically oxidizing ("anodizing") the sintered anode so that a dielectric layer is formed over and/or within the anode. For example, a tantalum (Ta) anode may be anodized to tantalum pentoxide ($Ta_2O_5$). Typically, anodization is performed by initially applying a solution to the anode, such as by dipping anode into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 250 V, and in some embodiments, from about 9 to about 200 V, and in some embodiments, from about 20 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

Although not required, in certain embodiments, the dielectric layer may possess a differential thickness throughout the anode in that it possesses a first portion that overlies an external surface of the anode and a second portion that overlies an interior surface of the anode. In such embodiments, the first portion is selectively formed so that its thickness is greater than that of the second portion. It should be understood, however, that the thickness of the dielectric layer need not be uniform within a particular region. Certain portions of the dielectric layer adjacent to the external surface may, for example, actually be thinner than certain portions of the layer at the interior surface, and vice versa. Nevertheless, the dielectric layer may be formed such that at least a portion of the layer at the external surface has a greater thickness than at least a portion at the interior surface. Although the exact difference in these thicknesses may vary depending on the particular application, the ratio of the thickness of the first portion to the thickness of the second portion is typically from about 1.2 to about 40, in some embodiments from about 1.5 to about 25, and in some embodiments, from about 2 to about 20.

To form a dielectric layer having a differential thickness, a multi-stage process is generally employed. In each stage of the process, the sintered anode is anodically oxidized ("anodized") to form a dielectric layer (e.g., tantalum pentoxide). During the first stage of anodization, a relatively small forming voltage is typically employed to ensure that the desired dielectric thickness is achieved for the inner region, such as forming voltages ranging from about 1 to about 90 volts, in some embodiments from about 2 to about 50 volts, and in some embodiments, from about 5 to about 20 volts. Thereafter, the sintered body may then be anodically oxidized in a second stage of the process to increase the thickness of the dielectric to the desired level. This is generally accomplished by anodizing in an electrolyte at a higher voltage than employed during the first stage, such as at forming voltages ranging from about 50 to about 350 volts, in some embodiments from about 60 to about 300 volts, and in some embodiments, from about 70 to about 200 volts. During the first and/or second stages, the electrolyte may be kept at a temperature within the range of from about 15° C. to about 95° C., in some embodiments from about 20° C. to about 90° C., and in some embodiments, from about 25° C. to about 85° C.

The electrolytes employed during the first and second stages of the anodization process may be the same or different. Typically, however, it is desired to employ different solutions to help better facilitate the attainment of a higher thickness at the outer portions of the dielectric layer. For example, it may be desired that the electrolyte employed in the second stage has a lower ionic conductivity than the electrolyte employed in the first stage to prevent a significant amount of oxide film from forming on the internal surface of anode. In this regard, the electrolyte employed during the first stage may contain an acidic compound, such as hydrochloric acid, nitric acid, sulfuric acid, phosphoric acid, polyphosphoric acid, boric acid, boronic acid, etc. Such an electrolyte may have an electrical conductivity of from about 0.1 to about 100 mS/cm, in some embodiments from about 0.2 to about 20 mS/cm, and in some embodiments, from about 1 to about 10 mS/cm, determined at a temperature of 25° C. The electrolyte employed during the second stage typically contains a salt of a weak acid so that the hydronium ion concentration increases in the pores as a result of charge passage therein. Ion transport or diffusion is such that the weak acid anion moves into the pores as necessary to balance the electrical charges. As a result, the concentration of the principal conducting species (hydronium ion) is reduced in the establishment of equilibrium between the hydronium ion, acid anion, and undissociated acid, thus forms a poorer-conducting species. The reduction in the concentration of the conducting species results in a relatively high voltage drop in the electrolyte, which hinders further anodization in the interior while a thicker oxide layer, is being built up on the outside to a higher formation voltage in the region of continued high conductivity. Suitable weak acid salts may include, for instance, ammonium or alkali metal salts (e.g., sodium, potassium, etc.) of boric acid, boronic acid, acetic acid, oxalic acid, lactic acid, adipic acid, etc. Particularly suitable salts include sodium tetraborate and ammonium pentaborate. Such electrolytes typically have an electrical conductivity of from about 0.1 to about 20 mS/cm, in some embodiments from about 0.5 to about 10 mS/cm, and in some embodiments, from about 1 to about 5 mS/cm, determined at a temperature of 25° C.

If desired, each stage of anodization may be repeated for one or more cycles to achieve the desired dielectric thickness. Furthermore, the anode may also be rinsed or washed with another solvent (e.g., water) after the first and/or second stages to remove the electrolyte.

C. Solid Electrolyte

As indicated above, a solid electrolyte overlies the dielectric and generally functions as the cathode for the capacitor assembly. The solid electrolyte contains one or more layers containing extrinsically and/or intrinsically conductive polymer particles. One benefit of employing such particles is that they can minimize the presence of ionic species (e.g., $Fe^{2+}$ or $Fe^{3+}$) produced during conventional in situ polymerization processes, which can cause dielectric breakdown under high electric field due to ionic migration. Thus, by applying the conductive polymer as pre-polymerized particles rather through in situ polymerization, the resulting capacitor may exhibit a relatively high "breakdown voltage." If desired, the solid electrolyte may be formed from one or multiple layers. When multiple layers are employed, it is possible that one or more of the layers includes a conductive polymer formed by in situ polymerization. However, when it is desired to achieve very high breakdown voltages, the present inventors have discovered that the solid electrolyte is formed primarily from the conductive particles described above, and that it is generally free of conductive polymers formed via in situ polymerization. Regardless of the number of layers employed, the resulting solid electrolyte typically has a total a thickness of from about 1 micrometer (μm) to about 200 μm, in some embodiments from about 2 μm to about 50 μm, and in some embodiments, from about 5 μm to about 30 μm.

In certain embodiments, an "extrinsically" conductive polymer may be employed in the solid electrolyte that has repeating units of the following formula (III):

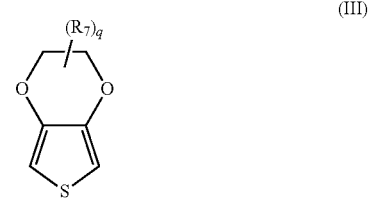

wherein, $R_7$ is a linear or branched, $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); $C_5$ to $C_{12}$ cycloalkyl radical (e.g., cyclopentyl, cyclohexyl, cycloheptyl, cyclooctyl, cyclononyl, cyclodecyl, etc.); $C_6$ to $C_{14}$ aryl radical (e.g., phenyl, naphthyl, etc.); $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); and q is an integer from 0 to 8, in some embodiments, from 0 to 2, and in one embodiment, 0. In one particular embodiment, "q" is 0 and the polymer is poly(3,4-ethylenedioxythiophene). One commercially suitable example of a monomer suitable for forming such a polymer is 3,4-ethylenedioxthiophene, which is available from Heraeus under the designation Clevios™ M.

The polymers of formula (III) are generally considered to be "extrinsically" conductive to the extent that they typically require the presence of a separate counterion that is not covalently bound to the polymer. The counterion may be a monomeric or polymeric anion that counteracts the charge of the conductive polymer. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

Intrinsically conductive polymers may also be employed that have a positive charge located on the main chain that is at least partially compensated by anions covalently bound to the polymer. For example, one example of a suitable intrinsically conductive polymer may have repeating units of the following formula (I):

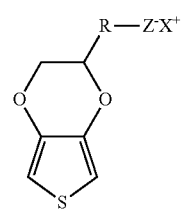

(I)

wherein,

R is $(CH_2)_a$—O—$(CH_2)_b$;

a is from 0 to 10, in some embodiments from 0 to 6, and in some embodiments, from 1 to 4 (e.g., 1);

b is from 1 to 18, in some embodiments from 1 to 10, and in some embodiments, from 2 to 6 (e.g., 2, 3, 4, or 5);

Z is an anion, such as $SO_3^-$, $C(O)O^-$, $BF_4^-$, $CF_3SO_3^-$, $SbF_6^-$, $N(SO_2CF_3)_2^-$, $C_4H_3O_4^-$, $ClO_4^-$, etc.;

X is a cation, such as hydrogen, an alkali metal (e.g., lithium, sodium, rubidium, cesium or potassium), ammonium, etc.

In one particular embodiment, Z in formula (I) is a sulfonate ion such that the intrinsically conductive polymer contains repeating units of the following formula (II):

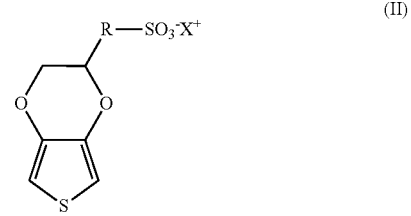

(II)

wherein, R and X are defined above. In formula (I) or (II), a is preferably 1 and b is preferably 3 or 4. Likewise, X is preferably sodium or potassium.

If desired, the polymer may be a copolymer that contains other types of repeating units. In such embodiments, the repeating units of formula (I) typically constitute about 50 mol. % or more, in some embodiments from about 75 mol. % to about 99 mol. %, and in some embodiments, from about 85 mol. % to about 95 mol. % of the total amount of repeating units in the copolymer. Of course, the polymer may also be a homopolymer to the extent that it contains 100 mol. % of the repeating units of formula (I). Specific examples of such homopolymers include poly(4-(2,3-dihydrothieno-[3,4-b][1,4]dioxin-2-ylmethoxy)-1-butane-sulphonic acid, salt) and poly(4-(2,3-dihydrothieno-[3,4-b][1,4] dioxin-2-ylmethoxy)-1-propanesulphonic acid, salt).

Regardless of the particular nature of the polymer, the resulting conductive polymer particles typically have an average size (e.g., diameter) of from about 1 to about 80 nanometers, in some embodiments from about 2 to about 70 nanometers, and in some embodiments, from about 3 to about 60 nanometers. The diameter of the particles may be determined using known techniques, such as by ultracentrifuge, laser diffraction, etc. The shape of the particles may likewise vary. In one particular embodiment, for instance, the particles are spherical in shape. However, it should be understood that other shapes are also contemplated by the present invention, such as plates, rods, discs, bars, tubes, irregular shapes, etc.

Although not necessarily required, the conductive polymer particles may be applied in the form of a dispersion. The concentration of the conductive polymer in the dispersion may vary depending on the desired viscosity of the dispersion and the particular manner in which the dispersion is to be applied to the capacitor element. Typically, however, the polymer constitutes from about 0.1 to about 10 wt. %, in some embodiments from about 0.4 to about 5 wt. %, and in some embodiments, from about 0.5 to about 4 wt. % of the dispersion. The dispersion may also contain one or more components to enhance the overall properties of the resulting solid electrolyte. For example, the dispersion may contain a binder to further enhance the adhesive nature of the polymeric layer and also increase the stability of the particles within the dispersion. The binder may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or crosslinkable polymers, such as polyurethanes, polyacrylates or polyolefins, and subsequent crosslinking. Dispersion agents may also be employed to facilitate the ability to apply the layer to the anode. Suitable dispersion agents include solvents, such as aliphatic alcohols (e.g., methanol, ethanol, i-propanol and butanol), aliphatic ketones (e.g., acetone and methyl ethyl ketones), aliphatic carboxylic acid esters (e.g., ethyl acetate and butyl acetate), aromatic hydrocarbons (e.g., toluene and xylene), aliphatic hydrocarbons (e.g., hexane, heptane and cyclohexane), chlorinated hydrocarbons (e.g., dichloromethane and dichloroethane), aliphatic nitriles (e.g., acetonitrile), aliphatic sulfoxides and sulfones (e.g., dimethyl sulfoxide and sulfolane), aliphatic carboxylic acid amides (e.g., methylacetamide, dimethylacetamide and dimethylformamide), aliphatic and araliphatic ethers (e.g., diethylether and anisole), water, and mixtures of any of the foregoing solvents. A particularly suitable dispersion agent is water.

In addition to those mentioned above, still other ingredients may also be used in the dispersion. For example, conventional fillers may be used that have a size of from about 10 nanometers to about 100 micrometers, in some embodiments from about 50 nanometers to about 50 micrometers, and in some embodiments, from about 100 nanometers to about 30 micrometers. Examples of such fillers include calcium carbonate, silicates, silica, calcium or barium sulfate, aluminum hydroxide, glass fibers or bulbs, wood flour, cellulose powder carbon black, electrically conductive polymers, etc. The fillers may be introduced into the dispersion in powder form, but may also be present in another form, such as fibers.

Surface-active substances may also be employed in the dispersion, such as ionic or non-ionic surfactants. Furthermore, adhesives may be employed, such as organofunctional silanes or their hydrolysates, for example 3-glycidoxypropyltrialkoxysilane, 3-aminopropyl-triethoxysilane, 3-mercaptopropyl-trimethoxysilane, 3-metacryloxypropyltrimethoxysilane, vinyltrimethoxysilane or octyltriethoxysilane. The dispersion may also contain additives that increase conductivity, such as ether group-containing compounds (e.g., tetrahydrofuran), lactone group-containing compounds (e.g., γ-butyrolactone or γ-valerolactone), amide or lactam group-containing compounds (e.g., caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, or pyrrolidone), sulfones and sulfoxides (e.g., sulfolane (tetramethylenesulfone) or dimethylsulfoxide (DMSO)), sugar or sugar derivatives (e.g., saccharose, glucose, fructose, or lactose), sugar alcohols (e.g., sorbitol or mannitol), furan derivatives (e.g., 2-furancarboxylic acid or 3-furancarboxylic acid), an alcohols (e.g., ethylene glycol, glycerol, di- or triethylene glycol).

The dispersion may be applied using a variety of known techniques, such as by spin coating, impregnation, pouring, dropwise application, injection, spraying, doctor blading, brushing, printing (e.g., ink-jet, screen, or pad printing), or dipping. The viscosity of the dispersion is typically from about 0.1 to about 100,000 mPas (measured at a shear rate of 100 s$^{-1}$), in some embodiments from about 1 to about 10,000 mPas, in some embodiments from about 10 to about 1,500 mPas, and in some embodiments, from about 100 to about 1000 mPas.

i. Inner Layers

The solid electrolyte is generally formed from one or more "inner" conductive polymer layers. The term "inner" in this context refers to one or more layers formed from the same material and that overly the dielectric, whether directly or via another layer (e.g., adhesive layer). The inner layer(s), for example, may contain an intrinsically and/or extrinsically conductive polymer such as described above. In one particular embodiment, the inner layer(s) are generally free of extrinsically conductive polymers and thus formed primarily from intrinsically conductive polymers. More particularly, intrinsically conductive polymers may constitute about 50 wt. % or more, in some embodiments about 70 wt. % or more, and in some embodiments, about 90 wt. % or more (e.g., 100 wt. %) of the inner layer(s). One or multiple inner layers may be employed. For example, the solid electrolyte typically contains from 2 to 30, in some embodiments from 4 to 20, and in some embodiments, from about 5 to 15 inner layers (e.g., 10 layers).

ii. Outer Layers

The solid electrolyte may contain only "inner layers" so that it is essentially formed from the same material, e.g., intrinsically and/or extrinsically conductive polymers. Nevertheless, in other embodiments, the solid electrolyte may also contain one or more optional "outer" conductive polymer layers that are formed from a different material than the inner layer(s) and overly the inner layer(s). For example, the outer layer(s) may be formed from a dispersion of extrinsically conductive polymer particles. In one particular embodiment, the outer layer(s) are formed primarily from such extrinsically conductive polymer particles in that they constitute about 50 wt. % or more, in some embodiments about 70 wt. % or more, and in some embodiments, about 90 wt. % or more (e.g., 100 wt. %) of a respective outer layer. One or multiple outer layers may be employed. For example, the solid electrolyte may contain from 2 to 30, in some embodiments from 4 to 20, and in some embodiments, from about 5 to 15 outer layers, each of which may optionally be formed from a dispersion of the extrinsically conductive polymer particles.

If desired, a hydroxyl-functional nonionic polymer may also be employed in the outer layer(s) of the solid electrolyte. The term "hydroxy-functional" generally means that the compound contains at least one hydroxyl functional group or is capable of possessing such a functional group in the presence of a solvent. Without intending to be limited by theory, it is believed that the use of a hydroxy-functional polymer with a certain molecular weight can minimize the likelihood of chemical decomposition at high voltages. For instance, the molecular weight of the hydroxy-functional polymer may be from about 100 to 10,000 grams per mole, in some embodiments from about 200 to 2,000, in some embodiments from about 300 to about 1,200, and in some embodiments, from about 400 to about 800.

Any of a variety of hydroxy-functional nonionic polymers may generally be employed for this purpose. In one embodiment, for example, the hydroxy-functional polymer is a polyalkylene ether. Polyalkylene ethers may include polyalkylene glycols (e.g., polyethylene glycols, polypropylene glycols polytetramethylene glycols, polyepichlorohydrins, etc.), polyoxetanes, polyphenylene ethers, polyether ketones, and so forth. Polyalkylene ethers are typically predominantly linear, nonionic polymers with terminal hydroxy groups. Particularly suitable are polyethylene glycols, polypropylene glycols and polytetramethylene glycols (polytetrahydrofurans), which are produced by polyaddition of ethylene oxide, propylene oxide or tetrahydrofuran onto water. The polyalkylene ethers may be prepared by polycondensation reactions from diols or polyols. The diol component may be selected, in particular, from saturated or unsaturated, branched or unbranched, aliphatic dihydroxy compounds containing 5 to 36 carbon atoms or aromatic dihydroxy compounds, such as, for example, pentane-1,5-diol, hexane-1,6-diol, neopentyl glycol, bis-(hydroxymethyl)-cyclohexanes, bisphenol A, dimer diols, hydrogenated dimer diols or even mixtures of the diols mentioned. In addition, polyhydric alcohols may also be used in the polymerization reaction, including for example glycerol, di- and polyglycerol, trimethylolpropane, pentaerythritol or sorbitol.

In addition to those noted above, other hydroxy-functional nonionic polymers may also be employed in the present invention. Some examples of such polymers include, for instance, ethoxylated alkylphenols; ethoxylated or propoxylated $C_6$-$C_{24}$ fatty alcohols; polyoxyethylene glycol alkyl ethers having the general formula: $CH_3$—$(CH_2)_{10\text{-}16}$—$(O$—$C_2H_4)_{1\text{-}25}$—OH (e.g., octaethylene glycol monododecyl ether and pentaethylene glycol monododecyl ether); polyoxypropylene glycol alkyl ethers having the general formula: $CH_3$—$(CH_2)_{10\text{-}16}$—$(O$—$C_3H_6)_{1\text{-}25}$—OH; polyoxyethylene glycol octylphenol ethers having the following general formula: $C_8H_{17}$—$(C_6H_4)$—$(O$—$C_2H_4)_{1\text{-}25}$—OH (e.g., Triton™ X-100); polyoxyethylene glycol alkylphenol ethers having the following general formula: $C_9H_{19}$—$(C_6H_4)$—$(O$—$C_2H_4)_{1\text{-}25}$—OH (e.g., nonoxynol-9); polyoxyethylene glycol esters of $C_8$-$C_{24}$ fatty acids, such as polyoxyethylene glycol sorbitan alkyl esters (e.g., polyoxyethylene (20) sorbitan monolaurate, polyoxyethylene (20) sorbitan monopalmitate, polyoxyethylene (20) sorbitan monostearate, polyoxyethylene (20) sorbitan monooleate, PEG-20 methyl glucose distearate, PEG-20 methyl glucose sesquistearate, PEG-80 castor oil, and PEG-20 castor oil, PEG-3 castor oil, PEG 600 dioleate, and PEG 400 dioleate) and polyoxyethylene glycerol alkyl esters (e.g., polyoxyethylene-23 glycerol laurate and polyoxyethylene-20 glycerol stearate); polyoxyethylene glycol ethers of $C_8$-$C_{24}$ fatty acids (e.g., polyoxyethylene-10 cetyl ether, polyoxyethylene-10 stearyl ether, polyoxyethylene-20 cetyl ether, polyoxyethylene-10 oleyl ether, polyoxyethylene-20 oleyl ether, polyoxyethylene-20 isohexadecyl ether, polyoxyethylene-15 tridecyl ether, and polyoxyethylene-6 tridecyl ether); block copolymers of polyethylene glycol and polypropylene glycol (e.g., Poloxamers); and so forth, as well as mixtures thereof.

The hydroxy-functional nonionic polymer may be incorporated into the outer layers in a variety of different ways. In certain embodiments, for instance, the nonionic polymer may simply be incorporated into a dispersion of conductive polymers. In such embodiments, the concentration of the nonionic polymer in the layer may be from about 1 wt. % to about 50 wt. %, in some embodiments from about 5 wt. % to about 40 wt. %, and in some embodiments, from about 10 wt. % to about 30 wt. %. In other embodiments, however, the nonionic polymer may be applied after the initial outer layer(s) are formed. In such embodiments, the technique used to apply the nonionic polymer may vary. For example, the nonionic polymer may be applied in the form of a liquid solution using various methods, such as immersion, dipping, pouring, dripping, injection, spraying, spreading, painting or printing, for example, inkjet, or screen printing. Solvents known to the person skilled in the art can be employed in the solution, such as water, alcohols, or a mixture thereof. The concentration of the nonionic polymer in such a solution typically ranges from about 5 wt. % to about 95 wt. %, in some embodiments from about 10 wt. % to about 70 wt. %, and in some embodiments, from about 15 wt. % to about 50 wt. % of the solution. If desired, such solutions may be generally free of conductive polymers. For example, conductive polymers may constitute about 2 wt. % or less, in some embodiments about 1 wt. % or less, and in some embodiments, about 0.5 wt. % or less of the solution.

D. External Polymer Coating

Although not required, an external polymer coating may be applied to the anode body and overlie the solid electrolyte. The external polymer coating generally contains one or more layers formed from pre-polymerized conductive polymer particles such as described above (e.g., dispersion of extrinsically conductive polymer particles). The external coating may be able to further penetrate into the edge region of the capacitor body to increase the adhesion to the dielectric and result in a more mechanically robust part, which may reduce equivalent series resistance and leakage current. Because it is generally intended to improve the degree of edge coverage rather to impregnate the interior of the anode body, the particles used in the external coating typically have a larger size than those employed in the solid electrolyte. For example, the ratio of the average size of the particles employed in the external polymer coating to the average size of the particles employed in any dispersion of the solid electrolyte is typically from about 1.5 to about 30, in some embodiments from about 2 to about 20, and in some embodiments, from about 5 to about 15. For example, the particles employed in the dispersion of the external coating may have an average size of from about 80 to about 500 nanometers, in some embodiments from about 90 to about 250 nanometers, and in some embodiments from about 100 to about 200 nanometers.

If desired, a crosslinking agent may also be employed in the external polymer coating to enhance the degree of adhesion to the solid electrolyte. Typically, the crosslinking agent is applied prior to application of the dispersion used in the external coating. Suitable crosslinking agents are described, for instance, in U.S. Patent Publication No. 2007/0064376 to Merker, et al. and include, for instance, amines (e.g., diamines, triamines, oligomer amines, polyamines, etc.); polyvalent metal cations, such as salts or compounds of Mg, Al, Ca, Fe, Cr, Mn, Ba, Ti, Co, Ni, Cu, Ru, Ce or Zn, phosphonium compounds, sulfonium compounds, etc. Particularly suitable examples include, for instance, 1,4-diaminocyclohexane, 1,4-bis(amino-methyl) cyclohexane, ethylenediamine, 1,6-hexanediamine, 1,7-heptanediamine, 1,8-octanediamine, 1,9-nonanediamine, 1,10-decanediamine, 1,12-dodecanediamine, N,N-dimethylethylenediamine, N,N,N',N'-tetramethylethylenediamine, N,N,N',N'-tetramethyl-1,4-butanediamine, etc., as well as mixtures thereof.

The crosslinking agent is typically applied from a solution or dispersion whose pH is from 1 to 10, in some embodiments from 2 to 7, in some embodiments, from 3 to 6, as determined at 25° C. Acidic compounds may be employed to help achieve the desired pH level. Examples of solvents or dispersants for the crosslinking agent include water or organic solvents, such as alcohols, ketones, carboxylic esters, etc. The crosslinking agent may be applied to the capacitor body by any known process, such as spin-coating, impregnation, casting, dropwise application, spray application, vapor deposition, sputtering, sublimation, knife-coating, painting or printing, for example inkjet, screen or pad printing. Once applied, the crosslinking agent may be dried prior to application of the polymer dispersion. This process may then be repeated until the desired thickness is achieved. For example, the total thickness of the entire external polymer coating, including the crosslinking agent and dispersion layers, may range from about 1 to about 50 µm, in some embodiments from about 2 to about 40 µm, and in some embodiments, from about 5 to about 20 µm.

E. Other Components of the Capacitor

If desired, the capacitor element may also contain other layers as is known in the art. For example, a protective coating may optionally be formed between the dielectric and solid electrolyte, such as one made of a relatively insulative resinous material (natural or synthetic). Such materials may have a specific resistivity of greater than about 10 Ω·cm, in some embodiments greater than about 100, in some embodiments greater than about 1,000 Ω·cm, in some embodiments greater than about $1 \times 10^5$ Ω·cm, and in some embodiments, greater than about $1 \times 10^{10}$ Ω·cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

If desired, the part may also be applied with a carbon layer (e.g., graphite) and silver layer, respectively. The silver coating may, for instance, act as a solderable conductor, contact layer, and/or charge collector for the capacitor and the carbon coating may limit contact of the silver coating with the solid electrolyte. Such coatings may cover some or all of the solid electrolyte.

The present invention may be better understood with reference to the following example.

TEST METHODS

Equivalent Series Resistance (ESR)

Equivalence series resistance may be measured using an Agilent E4980A Precision LCR Meter with Kelvin Leads 2.2 volt DC bias and a 0.5 volt peak to peak sinusoidal signal. The operating frequency was 100 kHz and the temperature was 23° C.±2° C.

Capacitance (CAP)

The capacitance was measured using an Agilent E4980A Precision LCR Meter with Kelvin Leads with 2.2 volt DC bias and a 0.5 volt peak to peak sinusoidal signal. The operating frequency was 120 Hz.

Leakage Current (DCL)

Leakage current was measured using a Keithley 2410 Source Meter measures leakage current at an appropriate voltage (Ur for 25° C.-85° C., 60% of Ur for 125° C. and 50% of Ur for 150° C.) after a minimum of 60 seconds.

EXAMPLE 9,000 µFV/g tantalum powder was used to form anode samples. Each anode sample was embedded with a tantalum wire, sintered at 1800° C., and pressed to a density of 5.3 g/cm³. The resulting pellets had a size of 4.6 mm×5.25 mm×2.6 mm. The pellets were anodized to 260V in a water/phosphoric acid electrolyte with a conductivity of 8.6 mS at a temperature of 85° C. to form the dielectric layer. A conductive polymer coating was then formed by dipping the anodes into a dispersion of poly(3,4-ethylenedioxythiophene) having a solids content of 1.1% and a viscosity of 20 mPa·s (Clevios™ K, H.C. Starck). Upon coating, the parts were dried at 125° C. for 20 minutes. This process was repeated 10 times. Thereafter, the parts were dipped into a dispersion of poly(3,4-ethylenedioxythiophene) having a solids content of 2% and a viscosity of 20 mPa·s (Clevios™ K, H.C. Starck). Upon coating, the parts were dried at 125° C. for 20 minutes. This process was not repeated. Next, the parts were dipped into a dispersion of poly(3,4-ethylenedioxythiophene) having a solids content of 2% and viscosity of 160 mPa·s (Clevios™ K, H.C. Starck). Upon coating, the parts were dried at 125° C. for 20 minutes. This process was repeated 8 times. The parts were then dipped into a graphite dispersion and dried. Finally, the parts were dipped into a silver dispersion and dried. Multiple parts of 100V capacitors were made in this manner.

A copper-based lead frame material was used to finish the assembly process to place the capacitor elements into a ceramic housing. The anode and cathode connective members of the leadframe were then glued to a gold cathode termination and welded to a gold anode termination located inside a ceramic housing having a length of 11.00 mm, a width of 6.00 mm, and a thickness of 2.20 mm. The housing had gold-plated solder pads on the bottom inside part of ceramic housing. The adhesive employed for the cathode connection was a silver paste (EPO-Tek E3035) and the adhesive was applied only between the leadframe portions and gold-plated solder pad. The welding employed for the anode connection was a resistance welding and the energy of 190 W was applied between the leadframe portions and ceramic housing gold plated solder pad during 90 ms. The assembly was then loaded in a convection oven to solder the paste. After that, a Kovar® lid having a length of 9.95 mm, a width of 4.95 mm, and a thickness of 0.10 mm was placed over the top of the container, closely on the seal ring of the ceramic housing (Kovar® ring having a thickness of 0.30 mm) so that there was no direct contact between the interior surface of the lid and the exterior surface of the attached capacitor. The resulting assembly was placed into a welding chamber and purged with nitrogen gas for 120 minutes/150° C. before seam welding between the seal ring and the lid was performed. No additional burn-in or healing was performed after the seam welding.

A module assembly was then formed as shown in FIG. 4. Thereafter, two finished parts were covered with Kapton® tape (to hold distance between finished parts avoid risk of mechanical damage during e.g., thermal cycling). The thickness of the Kovar® tape was at least 0.05 mm. Both of the finished parts were then connected together and two metal plates (Nilo alloy, thickness 0.15 mm) were placed on sides of two finished parts over the terminations to hold the parts together. The weld employed for the finished parts was a resistance weld. The Kapton® tape was finally removed. Multiple parts (180) of 44 μF/100V capacitors were made in this manner.

A summary of the electrical characteristics are shown below.

|  | Electrical Characteristics | | |
| --- | --- | --- | --- |
|  | DCL (μA) @ 60 s | CAP (μF) @ 120 Hz | ESR (mOhm) @ 100 kHz |
| Temperature [° C.] | | | |
| −55 | N/A | 37.04 | 52.9 |
| 25 | 0.59 | 38.01 | 58.9 |
| 85 | 0.76 | 39.96 | 54.8 |
| 125 | 1.27 | 45.37 | 53.5 |
| After Aging at 85° C. | | | |
| initial | 6.23 | 38.32 | 55.0 |
| 1000 hrs | 1.01 | 38.20 | 55.9 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A module comprising:
   first and second capacitor assemblies that each comprise:
      a capacitor element comprising a sintered porous anode body, a dielectric layer that overlies the anode body, and a solid electrolyte overlying the dielectric layer;
      an anode lead that extends from the capacitor element;
      a housing that defines an upper surface, a lower surface, and an interior cavity within which the capacitor element is positioned and hermetically sealed; and
      an external anode termination that is in electrical connection with the anode lead;
   wherein the second capacitor assembly is disposed on the first capacitor assembly, wherein the upper surface of the first capacitor assembly is adjacent to the upper surface of the second capacitor assembly, and the external anode termination of the first capacitor assembly is electrically connected to the external anode termination of the second capacitor assembly; and
   wherein at least one of the first and second capacitor assemblies include a restraint in contact with one or more of a rear surface, an upper surface, a front surface, or a side surface of the capacitor element.

2. The module of claim 1, further comprising a metal plate electrically connecting the external anode termination of the first capacitor assembly to the external anode termination of the second capacitor assembly.

3. The module of claim 1, wherein each of the first and second capacitor assemblies further comprises an external cathode termination in electrical connection with the solid electrolyte of the respective capacitor assembly.

4. The module of claim 3, further comprising a metal plate electrically connecting the external cathode termination of the first capacitor assembly to the external cathode termination of the second capacitor assembly.

5. The module of claim 1, further comprising a plurality of capacitor assemblies each comprising a capacitor element comprising a sintered porous anode body, a dielectric layer that overlies the anode body, and a solid electrolyte overlying the dielectric layer; an anode lead that extends from the capacitor element; a housing that defines an interior cavity within which the capacitor element is positioned and hermetically sealed; and an external anode termination that is in electrical connection with the anode lead; wherein each capacitor assembly of the plurality of capacitor assemblies is disposed on an upper or lower surface of an adjacent capacitor assembly and electrically connected to the adjacent capacitor assembly.

6. The module of claim 1, wherein the external anode terminations include a first portion that is provided in a plane that is generally parallel to the respective lower surface of the capacitor assembly and a second portion that is provided in a plane that is generally perpendicular to the respective lower surface of the capacitor assembly.

7. The module of claim 3, wherein the external cathode terminations include a first portion that is provided in a plane that is generally parallel to the respective lower surface of the capacitor assembly and a second portion that is provided in a plane that is generally perpendicular to the respective lower surface of the capacitor assembly.

8. The module of claim 7, wherein the second portions of each of the external anode terminations are electrically connected by being welded to a metal plate.

9. The module of claim 8, wherein the second portions of each of the external cathode terminations are electrically connected by being welded to a metal plate.

10. The module of claim 1, wherein the upper surface of the first capacitor assembly is a major surface of the first capacitor assembly and the upper surface of the second capacitor assembly is a major surface of the second capacitor assembly.

11. The module of claim 1, wherein one or both of the porous bodies of the first and second capacitor assemblies are formed from tantalum or niobium oxide powder.

12. The module of claim 1, wherein the interior cavities of the first and second capacitor assemblies have a gaseous atmosphere that contains an inert gas.

13. The module of claim 12, wherein inert gases constitute from about 50 wt. % to 100 wt. % of the gaseous atmosphere.

14. The module of claim 1, wherein the housings of the first and second capacitor assemblies are the same or different and individually formed from a metal, plastic, ceramic, or a combination thereof.

15. The module of claim 1, wherein the leads of the first and second capacitor assemblies extend in a longitudinal direction from the respective porous body, wherein the leads are positioned within the interior cavity of the housing.

16. The module of claim 15, wherein one or both of the capacitor elements of the first and second capacitor assemblies further comprise a connective member that contains a first portion that is positioned generally perpendicular to the longitudinal direction of the respective anode lead and connected thereto.

17. The module of claim 16, wherein the connective member further contains a second portion that is generally parallel to the longitudinal direction in which the respective anode lead extends.

18. The module of claim 17, wherein the second portion is positioned within the housing and is electrically connected to the respective external anode termination portion.

\* \* \* \* \*